United States Patent
Xiu et al.

(10) Patent No.: US 10,306,240 B2
(45) Date of Patent: May 28, 2019

(54) INTRA BLOCK COPY MODE FOR SCREEN CONTENT CODING

(71) Applicant: VID SCALE, INC., Wilmington, DE (US)

(72) Inventors: Xiaoyu Xiu, San Diego, CA (US); Yan Ye, San Diego, CA (US); Yuwen He, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 244 days.

(21) Appl. No.: 15/177,307

(22) Filed: Jun. 8, 2016

(65) Prior Publication Data
US 2016/0360210 A1 Dec. 8, 2016

Related U.S. Application Data

(60) Provisional application No. 62/172,645, filed on Jun. 8, 2015, provisional application No. 62/241,708, filed
(Continued)

(51) Int. Cl.
*H04N 19/126* (2014.01)
*H04N 19/176* (2014.01)
(Continued)

(52) U.S. Cl.
CPC ......... *H04N 19/176* (2014.11); *H04N 19/126* (2014.11); *H04N 19/184* (2014.11); *H04N 19/186* (2014.11); *H04N 19/593* (2014.11)

(58) Field of Classification Search
None
See application file for complete search history.

(56) References Cited

U.S. PATENT DOCUMENTS

2013/0243081 A1* 9/2013 Chen .................... H04N 19/597
375/240.02
2015/0271487 A1* 9/2015 Li ........................ H04N 19/105
375/240.02
(Continued)

FOREIGN PATENT DOCUMENTS

WO  WO 2015/124110 A1  8/2015

OTHER PUBLICATIONS

JCTVC-S0127, "CE2: Crosscheck of Test1—Unification of IBC to inter," Joint Collaborative Team on Video Coding, Proceedings Oct. 17-24, 2014.*
(Continued)

*Primary Examiner* — Jayanti K Patel
*Assistant Examiner* — Shadan E Haghani
(74) *Attorney, Agent, or Firm* — Condo Roccia Koptiw LLP

(57) ABSTRACT

A video block of a current picture may be coded in an intra block copy (IBC) mode. Weighted prediction may be disabled for the IBC-coded screen content video block. Fractional block vectors may be used for the chroma components of the IBC-coded video block. An interpolation filter may be utilized to generate chroma prediction samples for the video block. A decoded version of the current reference picture may be added to both reference picture list L0 and reference picture list L1 that are associated with the IBC-coded video block. When constrained intra prediction is applied, reference samples that may be used to predict an intra-coded video block may be limited to those in intra-coded neighboring blocks. The range of IBC searches may be restricted by imposing a maximum absolute value for block vectors.

16 Claims, 14 Drawing Sheets

Related U.S. Application Data on Oct. 14, 2015, provisional application No. 62/297,736, filed on Feb. 19, 2016.

(51) Int. Cl.
    *H04N 19/593* (2014.01)
    *H04N 19/184* (2014.01)
    *H04N 19/186* (2014.01)

(56) References Cited

U.S. PATENT DOCUMENTS

| | | | | |
|---|---|---|---|---|
| 2015/0271515 | A1* | 9/2015 | Pang | H04N 19/70 |
| | | | | 375/240.16 |
| 2015/0382009 | A1* | 12/2015 | Chen | H04N 19/82 |
| | | | | 375/240.16 |
| 2016/0100189 | A1 | 4/2016 | Pang et al. | |

OTHER PUBLICATIONS

"HEVC Screen Content Coding Reference Software SCM-2.0", Available at: https://hevc.hhi.fraunhofer.de/syn/syn_HEVCSoftware/tags/HM-15.0+RExt-8.0+SCM-2.0/, Retrieved on May 25, 2018, 1 pages.

"HEVC Screen Content Coding Reference Software Scm-4.0", Available at https://hevc.hhi.fraunhofer.de/syn/syn_HEVCSoftware/tags/HM-16.4+-SCM-4.0/, retrieved on Jul. 17, 2018, 1 page.

Bordes, Philippe, "Weighted Prediction", JCTVC-F265, 6th Meeting, Torino, IT, Jul. 14-22, 2011, pp. 1-11.

Bross et al., "High Efficiency Video Coding (HEVC) Text Specification Draft 10 (for FDIS & Consent)", JCTVC-L1003, 12th Meeting: Geneva, CH, Jan. 14-23, 2013, 321 pages.

Chen et al., "Scalable HEVC (SHVC) Working Draft 2", ISO/IEC JTC1/SC29/WG11 N13570, Incheon, South Korea, Apr. 2013, 66 pages.

ITU/ISO/IEC, "Joint Call for Proposals for Coding of Screen Content", ISO/IEC JTC1/SC29/WG11 MPEG2014/N14175, San Jose, USA, Jan. 2014, 16 pages.

ITUT-T, "Advanced Video Coding for Generic Audiovisual Services", ITU-T Rec H.264, Nov. 2007, 563 pages.

Joshi et al., "High Efficiency Video Coding (HEVC) Screen Content Coding: Draft 1", JCTVC-R1005, 18th Meeting: Sapporo, JP, Jun. 30-Jul. 9, 2014, 360 pages.

Joshi et al., "High Efficiency Video Coding (HEVC) Screen Content Coding: Draft 3", JCTVC-T1005, 20th Meeting: Geneva, CH, Feb. 10-17, 2015, 567 pages.

Li et al., "Adaptive Motion Vector Resolution for Screen Content", Microsoft Corporation, JCTVC-50085, 19th Meeting: Strasbourg, FR, Oct. 17-24, 2014, 14 pages.

Onno et al., "Suggested Combined Software and Text for Run-Based Palette Mode", Canon Research Centre France, InterDigital Communications, Inc., MediaTek, Inc., Qualcomm, Inc., 18th Meeting: Sapporo, JP, Jun. 30-Jul. 9, 2014, 10 pages.

Pang et al., "Intra Block Copy with Larger Search Region", Qualcomm, Inc., JCTVC-Q0139, 17th Meeting: Valencia, ES, Mar. 27-Apr. 4, 2014, 3 pages.

Pang et al., "Non-CE2 Test1: Intra Block Copy and Inter Signalling Unification", Qualcomm, Inc., MediaTek, Microsoft Corporation, JCTVC-T0227, 20th Meeting: Geneva, CH, Feb. 10-18, 2015, 3 pages.

Pang et al., "Non-RCE3: Intra Motion Compensation with 2-D MVs", Qualcomm, Inc., JCTVC-N0256, 14th Meeting: Vienna, AT, Jul. 25-Aug. 2, 2013, 12 pages.

Pu et al., "RCE1: Descriptions and Results for Experiments 1, 2, 3, and 4", Qualcomm, Inc., 15th Meeting: Geneva, CH, Oct. 25-Nov. 1, 2013, 9 pages.

Smpte, "VC-1 Compressed Video Bitstream Format and Decoding Process", SMPTE 421M-2006, Feb. 2006, 493 pages.

Tourapis et al., "H.264/14496-10 AVC Reference Software Manual", JVT-AE010, JM Reference Software JM16.1, Document Available at: http://iphome.hhi.de/suehring/tml/download/old_jm/jm16.1.zip, 2009, 90 pages.

Zhang et al., "SCCE5 Test 3.2.1: In-Loop Color-Space Transform", Qualcomm, Inc., InterDigital Communications, LLC, JCTVC-R0147, 18th Meeting: Sapporo, JP, Jun. 30-Jul. 9, 2014, 8 pages.

* cited by examiner

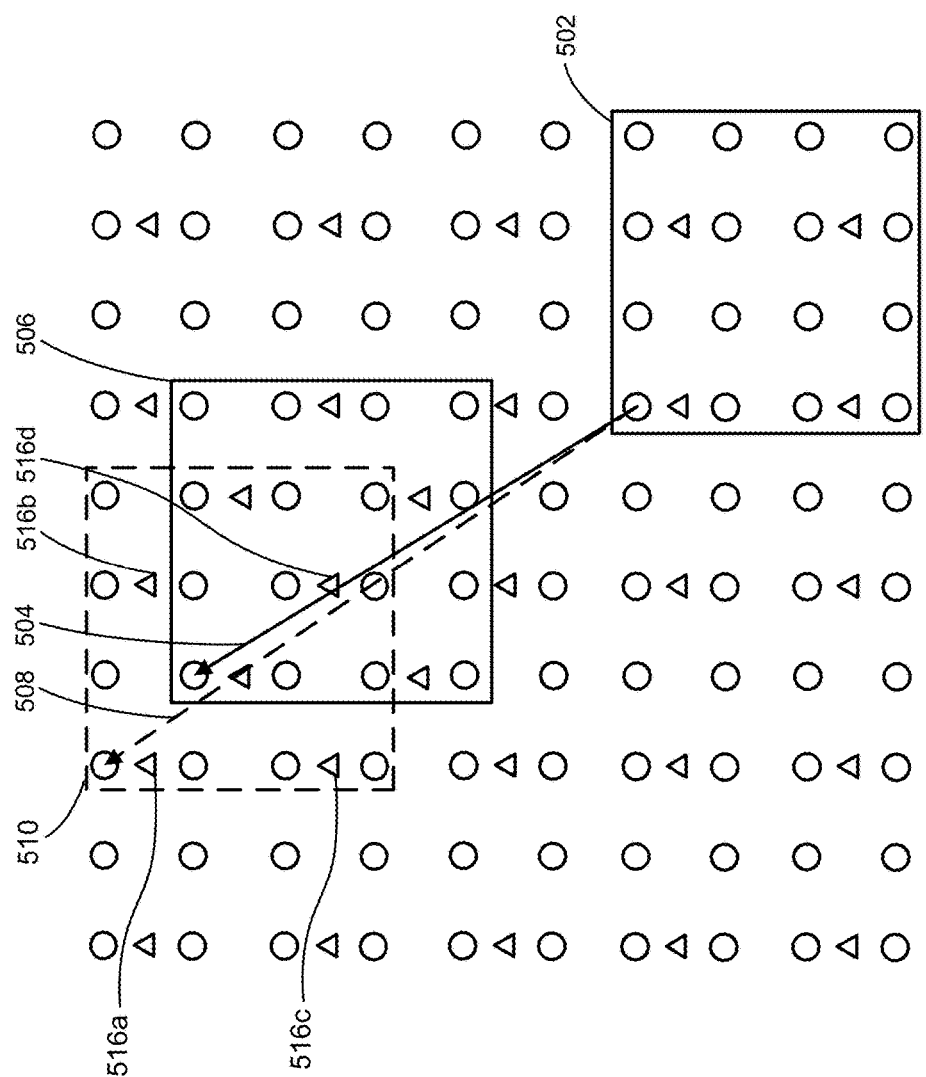

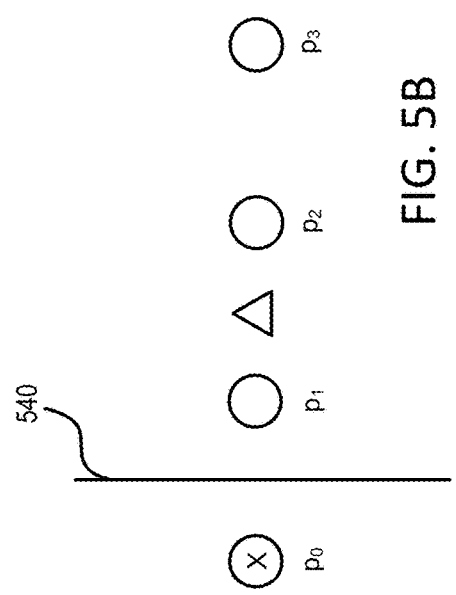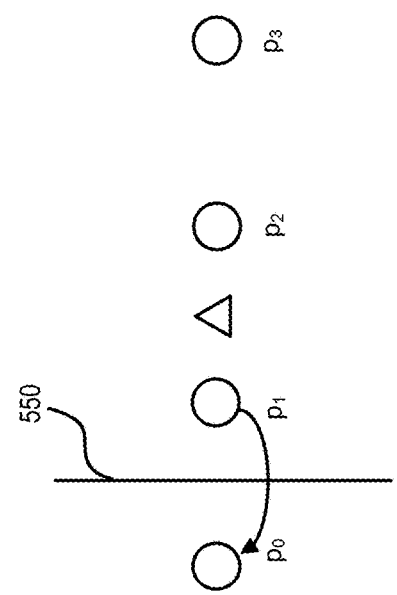

INTRA BLOCK COPY MODE FOR SCREEN CONTENT CODING

CROSS-REFERENCE TO RELATED APPLICATIONS

This application claims the benefit of Provisional U.S. Patent Application No. 62/172,645, filed Jun. 8, 2015, Provisional U.S. Patent Application No. 62/241,708, filed Oct. 14, 2015, and Provisional U.S. Patent Application No. 62/297,736, filed Feb. 19, 2016, the disclosures of which are incorporated herein by reference in their entireties.

BACKGROUND

Due to rapidly growing usage of video applications such as wireless display and cloud computing, screen content coding (SCC) has become increasingly important. Screen content videos usually comprise computer-generated content such as texts and graphics, and may thus possess different properties than natural content videos (e.g., videos captured by cameras). Systems, methods, and instrumentalities may be designed to utilize the unique properties of screen content so that it may be coded efficiently.

SUMMARY

Systems, methods, and instrumentalities are described herein for coding videos (e.g., screen content videos). Weighted prediction may be enabled or disabled during the coding of a video block of a current picture. For example, weighted prediction may be disabled if the video block is coded in an intra block copy (IBC) mode. Whether the IBC mode is enabled for the video block may be determined by comparing a picture order count associated with the current picture with the picture order count associated with a reference picture of the current picture. If the two picture order counts are different from each other, a determination may be made that the IBC mode may not be enabled and that weighted prediction may be applied. When weighted prediction is applied, a video bitstream associated with the video block may be generated with one or more weighted prediction parameters signaled the video bitstream. In certain embodiments, a further comparison between a layer ID associated with the current picture and a layer ID associated with the reference picture may be performed before a determination regarding the IBC mode and weighted prediction may be made. More specifically, if the respective layer IDs of the current picture and the reference picture are different, or if the respective pictures order counts of the current picture and the reference picture are different, a determination may be made that the IBC mode may not be enabled and that weighted prediction may be applied (e.g., one or more weighted prediction parameters may be signaled).

Fractional block vectors may be used to identify chroma reference samples for an IBC-coded video block. An interpolation filtering process may be utilized to generate chroma prediction samples for the video block based on the chroma reference samples. Further, when the IBC mode is enabled, a pseudo reference picture (e.g., a decoded version of the current picture) may be added to both reference picture list L0 and reference picture list L1 of the current picture. Constrained intra prediction (CIP) may be applied. The application of CIP may comply with certain restrictions including, for example, using only samples from intra-coded neighboring blocks to predict an intra-coded video block.

A video coding device described herein may include a video encoder and/or a video decoder. The systems, methods, and instrumentalities described herein are not limited to coding screen content videos and may be applied to code other video content as well.

BRIEF DESCRIPTION OF THE DRAWINGS

A more detailed understanding may be had from the following description, given by way of example in conjunction with the accompanying drawings wherein:

FIG. 5A is a diagram illustrating an example BV clipping operation for chroma components.

FIG. 5B is a diagram illustrating that reference samples of a neighboring slice may not be available for fractional chroma sample interpolation.

FIG. 5C is a diagram illustrating an example of cross-slice-boundary sample padding for fractional chroma sample interpolation.

DETAILED DESCRIPTION OF ILLUSTRATIVE EMBODIMENTS

A detailed description of illustrative embodiments will now be described with reference to the various Figures. Although this description provides examples of possible implementations, it should be noted that the examples are not intended to limit the scope of the application. Further, a video coding device as described herein may include a video encoder and/or a video decoder.

Figure 1:
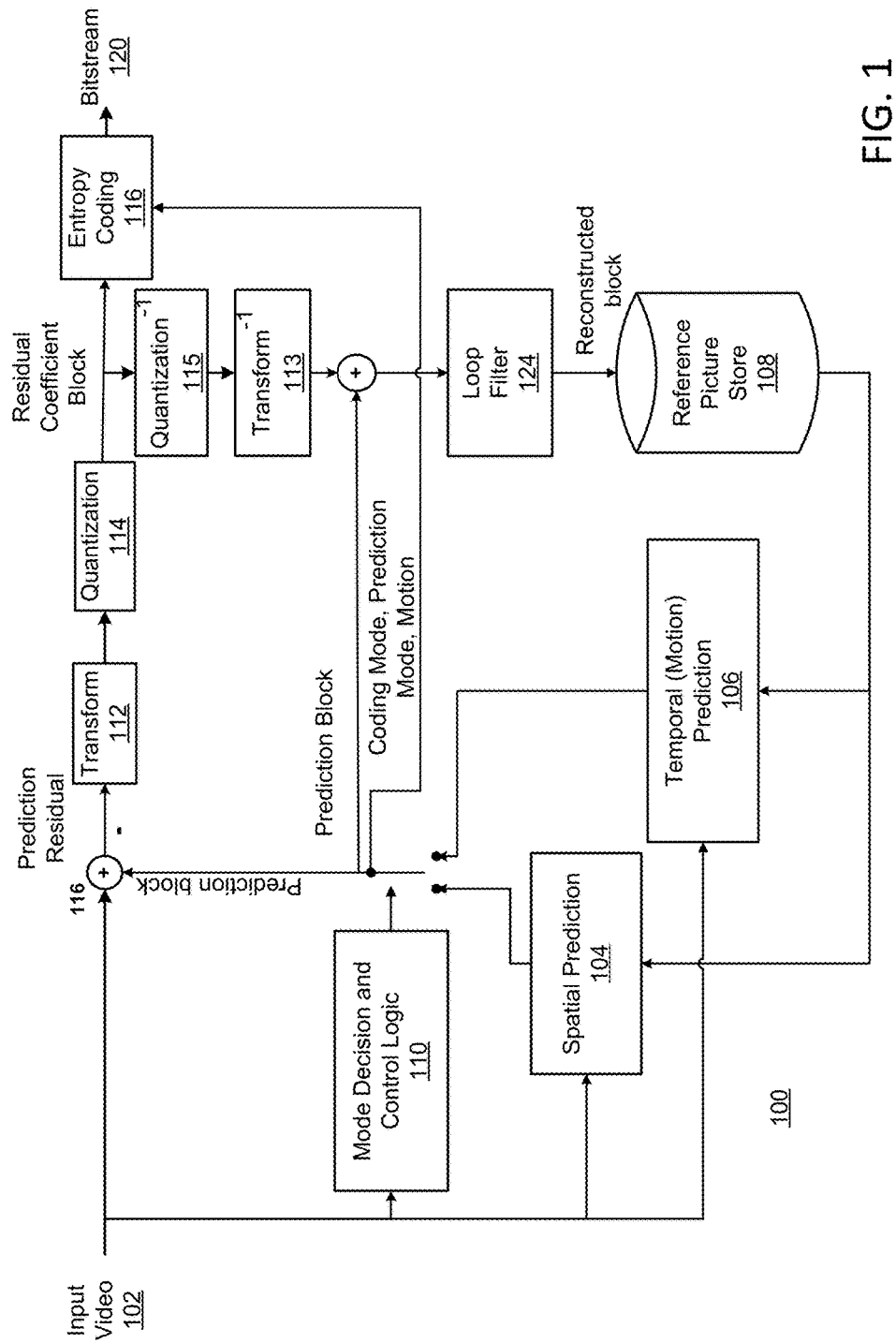
FIG. 1 is a diagram of an example video encoder according to one or more examples described herein.

FIG. 1 is a diagram of an example video encoder 100 in which one or more disclosed embodiments may be implemented. The video encoder 100 may conform to international video coding standards such as the MPEG-1, MPEG- 2, MPEG-4, H.264/MPEG-4 Advanced Video Coding (AVC), and/or High Efficiency Video Coding (HEVC). The video encoder 100 may be a standalone unit or part of a video broadcast system, a cable system, a network-based video streaming service, a gaming application and/or service, a multimedia communication system, and/or a variety of other applications and services. The video encoder 100 may be implemented in hardware, software, or a combination of hardware and software. For example, the video encoder 100 may utilize one or more special purpose processors, general purpose processors, graphics processing units (GPUs), Application Specific Integrated Circuits (ASICs), Field Programmable Gate Array (FPGA) circuits, state machines, and/or the like. One or more components of the video encoder 100 may be implemented with software or firmware incorporated in a computer-readable medium for execution by a computer or a processor. Examples of computer-readable media include electronic signals (transmitted over wired or wireless connections) and computer-readable storage media such as a read only memory (ROM), a random access memory (RAM), a register, cache memory, semiconductor memory devices, magnetic media (e.g., internal hard disks and removable disks), magneto-optical media, optical media (e.g., CD-ROM disks), and digital versatile disks (DVDs).

As shown in FIG. 1, the video encoder 100 may include a spatial prediction unit 104, a temporal (or motion) prediction unit 106, a reference picture store 108, a motion decision and control logic unit 110, a transform unit 112, an inverse transform unit 113, a quantization unit 114, a de-quantization unit 115, a scan unit (not shown), an entropy coding unit 116, and/or a loop filter 124. Although FIG. 1 depicts the video encoder 100 as having only one unit of each of the components described herein, a skilled person in the art will understand that multiple units of one or more of the components may be used to implement the functions described herein.

The video encoder 100 may be configured to receive an input video signal 102. The input video signal 102 may have a standard resolution (e.g., 640×880) or high resolution (e.g., 1920×1080 and beyond). The video encoder 100 may process the input video signal 102 block by block. Each video block may be referred to herein as a macblock ("MB") or a "coding tree unit" (CTU), and may have one of a plurality of sizes including 4×4 pixels, 8×8 pixels, 16×16 pixels, 32×32 pixels, or 64×64 pixels. Extended block sizes (e.g., CTUs of 64×64, 32×32 and 16×16 pixels) may be used to compress high resolution video signals (e.g., 1080 or higher). The extended block sizes may be selected at a sequence level and signaled in a Sequence Parameter Set (SPS). The extended block sizes (e.g., such as a CTU) may be partitioned into one or more coding units (CU), for example, via quad-tree splitting. A CU (e.g., a CU of 64×64 pixels) may be partitioned into prediction units (PUs). The video encoder 100 may perform prediction (e.g., intra or inter prediction) on each video block to, for example, exploit redundancy and irrelevancy inherent in the video block so as to reduce the amount of information that need to be compressed and/or delivered. In an example, the video encoder 100 may apply prediction at a CU level. When a CU is partitioned into prediction units, separate predictions may be applied to the prediction units.

The video encoder 100 may be configured to perform spatial prediction to a current video block at the spatial prediction unit 104. Such a prediction method may allow the video encoder 100 to predict pixels of the current video block using pixels from one or more previously-coded neighboring blocks of the same video frame, for example (the blocks used for prediction may be referred to herein as "prediction blocks"). The pixels of the neighboring block(s) may be highly correlated to the pixels of the current video block because, for example, the relevant video frame may contain many regions of smoothly varying intensity. Thus, by using spatial prediction, the video encoder 100 may be able to remove certain spatial redundancy from the current video block and code only residual pixels that cannot be spatially predicted. Example spatial prediction methods may include intra prediction, intra block copy prediction (IBC), and the like. Intra prediction may predict specific sample values using neighboring previously-coded pixel samples (e.g., a column or row of samples) from the current frame (e.g., not related to any other frame). IBC prediction may predict sample values for an entire block using a block of previously-coded samples from the current frame.

In addition to or in lieu of spatial prediction, the video encoder 100 may apply temporal prediction (e.g., "inter prediction" or "motion compensated prediction") to a video block using the temporal prediction unit 106. Temporal prediction may take advantage of the phenomenon that two adjacent video frames may have high temporal redundancy since typical video sequences do not change rapidly from one frame to the next. Accordingly, the video encoder 100 may use one or more prediction blocks from previously-coded video frames to predict the current video block so that temporal redundancy inherent in the video signal 102 may be removed. In an example, the video encoder 100 may be configured to calculate and/or signal the amount and direction of motion between the current video block and its prediction blocks using, for example, one or more motion vectors, and utilize the calculated motion information to further improve the efficiency of prediction. In one or more examples, the video encoder 100 may support multiple reference pictures and assign a reference picture index to each coded video block. The video encoder 100 may determine, based on a video block's reference picture index, from which reference picture and/or reference video block of the reference picture store 108 a temporal prediction signal may come. The reference picture index may be signaled.

The video encoder 100 may select a prediction mode based on logics stored in the mode decision and control logic unit 110. Multiple factors may be considered in the selection process including, for example, rate-distortion optimization (RDO) criteria and/or bit rate requirements. In one or more examples, the video encoder 100 may choose a prediction mode whose sum of absolute transform differences (SATD) is the minimum. In one or more examples, the video encoder 100 may select a prediction mode having the smallest rate distortion cost. Various other techniques may also be possible, all of which are within the scope of this disclosure.

The various prediction methods described herein may produce prediction residual (e.g., by subtracting prediction blocks from the current video block). The prediction residual may comprise a large set of highly correlated pixels. The video encoder 100 may transform (e.g., via the transform unit 112) and quantize (e.g., via the quantization unit 114) the prediction residual into a smaller set of less correlated (e.g., uncorrelated) coefficients (referred to herein as "transform coefficients") before scanning those transform coefficients (e.g., via the scan unit described herein) into a one-dimensional sequence of coefficients and feeding the sequence to the entropy coding unit 116. In one or more examples, the video encoder 100 may pass additional information such as coding mode, prediction mode, motion information, residual differential pulse code modulation (RDPCM) mode, and/or other coding parameters to the entropy coding unit 116. The additional information may be compressed and packed with the transform coefficients and sent to a video bitstream 120. The transform coefficients may be de-quantized (e.g., at the de-quantization unit 115), inverse transformed (e.g., at the inverse transform unit 112), and added back to the prediction block(s) to reconstruct the video block. In-loop filtering 124 such as de-blocking filtering and adaptive loop filtering may be applied to the reconstructed video block before it is put in the reference picture store 108 to code future video blocks.

Figure 2:
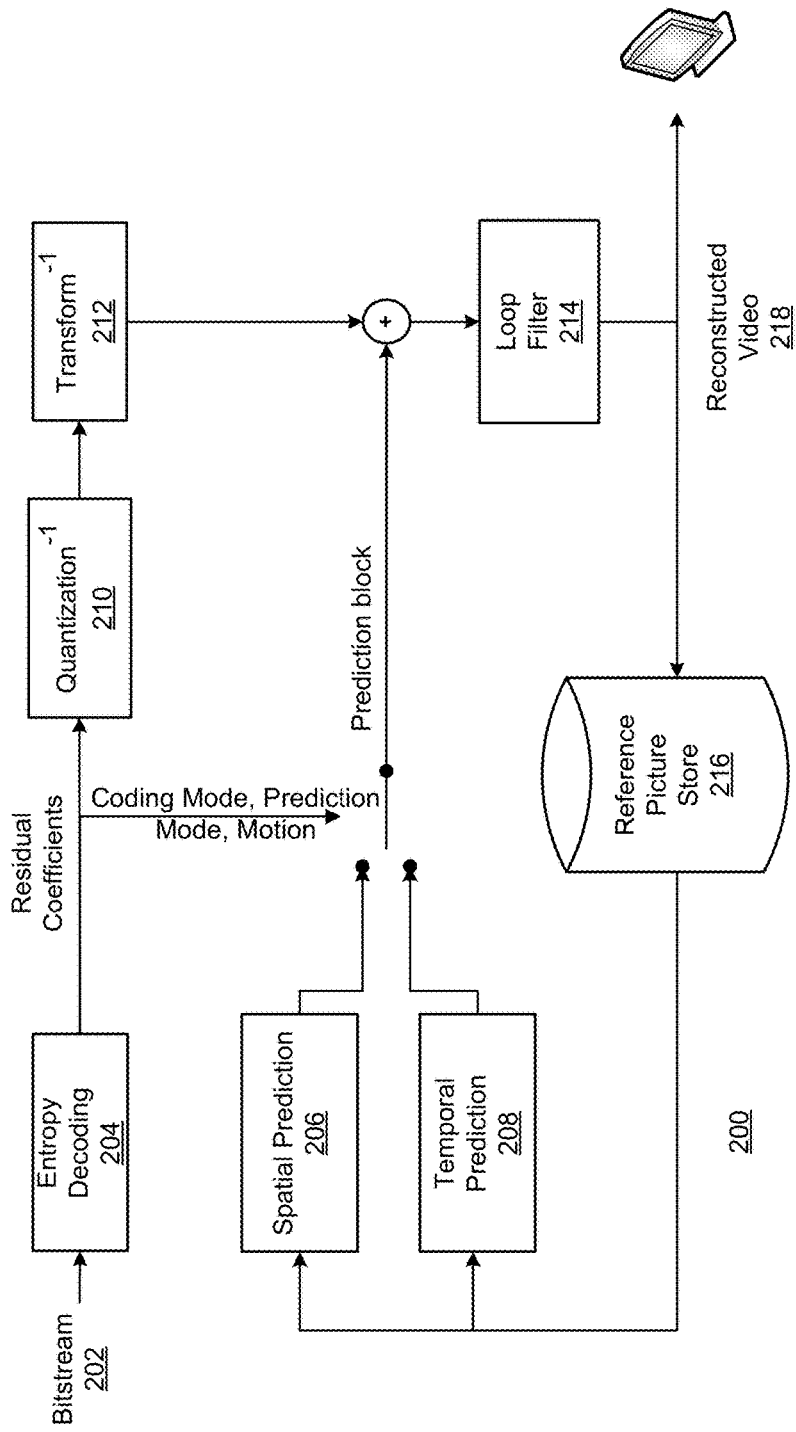
FIG. 2 is a diagram of an example video decoder according to one or more examples described herein.

FIG. 2 is a diagram of an example video decoder 200 in which one or more disclosed embodiments may be implemented. The example video decoder 200 may be located at a receiving end of a bitstream 202 and may receive the bitstream 202 over a variety of transport media including, for example, a public network (e.g., the Internet), an internal network (e.g., a corporate intranet), a virtual private network ("VPN"), a cellular network, a cable network, a serial communication link, an RS-485 communication link, an RS-232 communication link, an internal data bus, and/or the like. The video decoder 200 may utilize block-based decoding methods that conform to international video standards such as the MPEG-1, MPEG-2, MPEG-4, H.264/MPEG-4 Advanced Video Coding (AVC), and/or High Efficiency Video Coding (HEVC). The video decoder 200 may be a standalone unit or a part of a computer device, a mobile device, a television system, a gaming console and application, a multimedia communication system, and/or a variety of other devices and applications. The video decoder 200 may be implemented in hardware, software, or a combination of hardware and software. For example, the video decoder 200 may utilize one or more special purpose processors, general purpose processors, graphics processing units (GPUs), Application Specific Integrated Circuits (ASICs), Field Programmable Gate Array (FPGA) circuits, state machines, and the like. One or more components of the video decoder 200 may be implemented with software or firmware incorporated in a computer-readable medium for execution by a computer or a processor. Examples of computer-readable media include electronic signals (transmitted over wired or wireless connections) and computer-readable storage media such as a read only memory (ROM), a random access memory (RAM), a register, cache memory, semiconductor memory devices, magnetic media (e.g., internal hard disks and removable disks), magneto-optical media, optical media (e.g., CD-ROM disks), and digital versatile disks (DVDs).

The video decoder 200 may be operable to reconstruct a video signal based on an encoded version of the video signal (e.g., such as that produced by the video encoder 100). The reconstruction process may comprise receiving a block of encoded video (e.g., SCC video), obtaining the prediction blocks used for encoding the video block, recovering the prediction residual of the video block, and reconstructing the original video block. As such, the video decoder 200 may comprise components that perform functions inverse to those of the video encoder 100. For example, as shown in FIG. 2, the video decoder 200 may comprise an entropy decoding unit 204, a spatial prediction unit 206, a temporal prediction unit 208, a de-quantization unit 210, an inverse transform unit 212, a loop filter 214, and/or a reference picture store 216. The video decoder 200 may receive the video bitstream 202 at the entropy decoding unit 204. The entropy decoding unit 204 may unpack and entropy-decode the bitstream 202, from which the entropy decoding unit 204 may extract information such as the transform coefficients produced by the transform unit 112, the quantization unit 114, and/or the scan unit of the video encoder 100. Additional information including coding mode, prediction mode, RDPCM mode, and/or other parameters used for encoding the video block may also be extracted. Some of the extracted information may be sent to the spatial prediction unit 206 (e.g., if the video signal is intra-coded or IBC-coded) and/or the temporal prediction unit 208 (e.g., if the video signal is inter-coded) to obtain the prediction blocks. A transform coefficient block may be rebuilt and de-quantized (e.g., at the de-quantization unit 210) and inverse transformed (e.g., at the invers transform unit 212) to derive the prediction residual of the video block. The video decoder 200 may combine the residual video block and the prediction blocks to reconstruct the video block to its original form.

The video decoder 200 may apply in-loop filtering on the reconstructed video block at, e.g., the loop filter 214. Various in-loop filtering techniques may be used including, for example, deblocking filtering and adaptive loop filtering. Upon reconstruction and filtering, the video decoder 200 may put the reconstructed video 218 in the reference picture store 216 and may subsequently use the video blocks of the reference picture store 216 to code other images and/or drive a display device. As described herein, similar reconstruction and in-loop filtering may also take place at the video encoder 100 via, for example, de-quantization unit 115, inverse transform unit 113, loop filter 124, and/or reference picture store 108.

Various techniques and/or tools may be used to code videos. These techniques and/or tools may include, for example, IBC, palette coding, adaptive color transform (ACT), and adaptive motion vector precision. IBC is a block matching technique. In an example implementation of IBC, a current video block may be predicted as a displacement from a previously reconstructed block (e.g., a reference block) in a neighboring region/area of the same picture. The displacement may be measured and/or represented, for example, by a block vector (BV). The coding system (e.g., the encoder 100) may employ various search techniques to identify the BV and/or a corresponding reference block. For example, to achieve a tradeoff between coding performance and memory bandwidth complexity, the coding system may be configured to conduct a full-frame IBC search or a local IBC search in order to identify the reference block.

Figure 3:
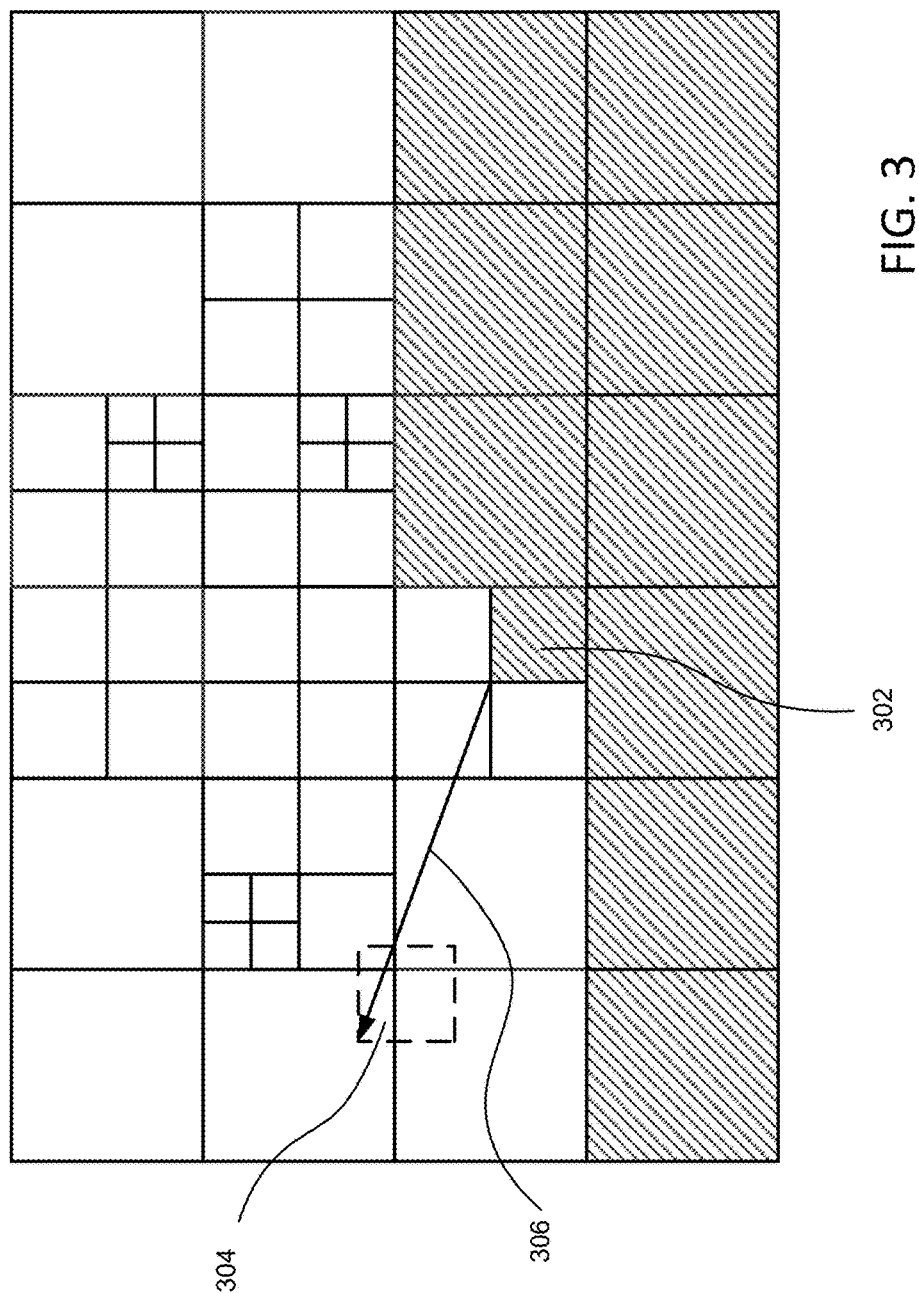
FIG. 3 is a diagram illustrating an example of a full frame intra block copy search.

FIG. 3 illustrates an example of a full-frame IBC search. Block 302 may represent a current block being coded. The blank and shaded areas may represent coded and un-coded areas, respectively. The full-frame IBC search option may be specified during configuration of the coding system (e.g., the encoder 100). Under the full-frame IBC search option, a reference block 304 may be identified among previously reconstructed pixels in the current picture (e.g., from all of the pixels in the current picture that have been reconstructed). A hash-based IBC search technique may be employed to determine the BV 306 for locating the reference block 304, and/or to control encoding complexity. Samples of the previously reconstructed area(s) may be maintained during the encoding and/or decoding processes prior to in-loop filtering (e.g., de-blocking and/or sample adaptive offset (SAO)).

Figure 4:
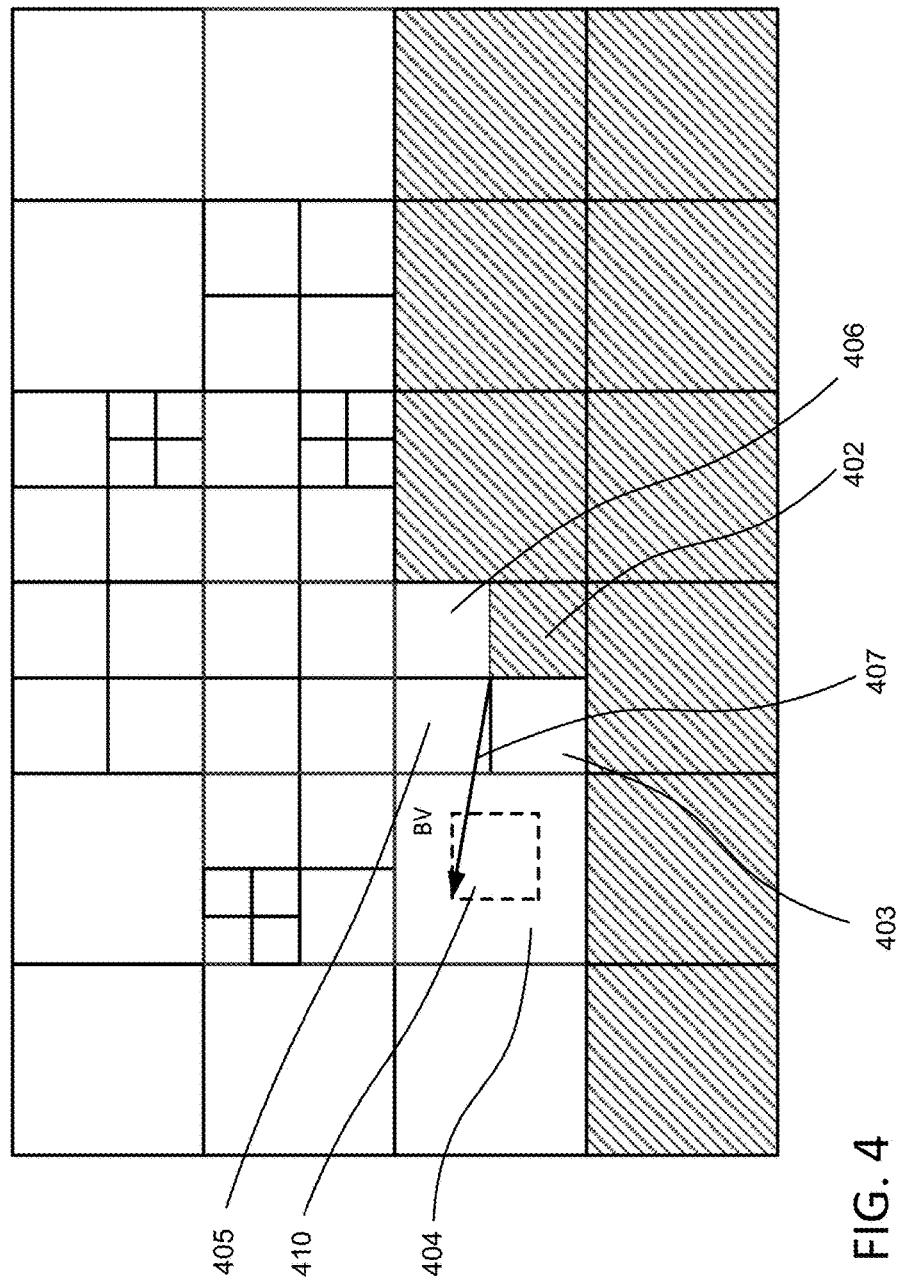
FIG. 4 is a diagram illustrating an example of a local intra block copy search.

FIG. 4 illustrates an example of a local IBC search. A local IBC search option may be specified during configuration of the encoding system (e.g., the encoder 100). Using local IBC search, IBC prediction of a current coding unit 402 may be performed using previously reconstructed samples (e.g., before the invocation of in-loop filtering) of a limited number of neighboring coding tree units. For example, the pixels that may be used for IBC prediction of the current CU 402 may comprise pixels of a coding tree unit (e.g., such as CTU 404) located to the left of the current CU 402 and/or previous coded pixels of the current CTU (e.g., such as areas 403, 405, and 406). Since a smaller set of samples may be used during the local IBC search, memory bandwidth demand (e.g., by screen content coding software) associated with IBC-related writing/reading may be reduced. A BV 407 may be determined to locate a reference block 410 for the current CU 402.

A block vector may be constrained to have an integer-pixel resolution/precision such that direct sample copy from a reference block may be used during motion compensation for IBC (e.g., without pixel interpolation). With such a constraint, a block vector with fractional pixel precision may be clipped (e.g., during motion compensation) such that the block vector may point to chroma components at inter pixel positions. The clipping operation may be conducted in accordance with Equations 1 and 2 if, for a given slice, the picture with an index refIdx from the reference picture list LX (where X may be 0 or 1) is not the same as the current picture. Otherwise, the clipping operation may be conducted in accordance with Equations 3 and 4, where mvLX[0] and mvLX[1] may represent horizontal and vertical luma motion vectors, mvCLX[0] and mvCLX[1] may represent horizontal and vertical chroma motion vectors, SubWidthC may represent the ratio between horizontal resolutions of luma and chroma, and SubHeightC may represent the ration between vertical resolutions of luma and chroma. For 4:2:0 videos, SubWidthC and SubHeightC may be equal to 2.

$$mvCLX[0]=mvLX[0]*2/SubWidthC \quad (1)$$

$$mvCLX[1]=mvLX[1]*2/SubHeightC \quad (2)$$

$$mvCLX[0]=((mvLX[0]>>(1+SubWidthC))*8 \quad (3)$$

$$mvCLX[1]=((mvLX[1]>>(1+SubHeightC))*8 \quad (4)$$

The clipping operation described herein may be suitable for a 4:4:4 chroma format (with which chroma and luma components may have the same resolution), for example, because clipping may reduce coding complexity and/or improve the quality (e.g., subjective quality and/or objective quality) of IBC-coded CUs (e.g., when the IBC-coded CUs have edges that are blurred or distorted by interpolation filtering). For certain non-4:4:4 chroma formats (e.g., 4:2:0 and 4:2:2), because the chroma components may have a different sampling rate than the luma components (e.g., in either or both of horizontal and vertical directions), clipping may cause misalignment of the chroma and luma components. This may be illustrated in FIG. 5A.

FIG. 5A illustrates the effect of BV clipping (e.g., performed in a motion compensation process) using an example clipping method. In the example, a current coding unit 502 may have a block size of 4×4 and the video sequence may be captured in a 4:2:0 chroma format. The luma and chroma samples of the video may be represented by circles and triangles, respectively. An original BV 504 may point to a first reference block 506 while a clipped BV 508 may point to a second reference block 510. If the clipped BV 508 is used to fetch chroma reference samples and the original BV 504 is used to fetch luma reference samples, the luma and chroma reference samples (e.g., of the reference blocks 506, 510) may be misaligned. If the current CU is being IBC-coded and a prediction signal with misaligned luma and chroma samples is used to predict the current CU, coding efficiency may be affected. The misalignment may produce undesirable artifacts (e.g., ghosting and/or color bleeding artifacts) in a reconstructed signal (e.g., along the boundaries between neighboring objects), which may compromise the subjective quality of the reconstructed video.

A fractional block vector may be permitted and used for the chroma components of an IBC-coded CU. The fractional block vector may be derived (e.g., as described herein) for identifying one or more chroma reference samples. The fractional block vector may point to fractional pixel positions. An interpolation filtering process may be utilized (e.g., when a block vector points to fractional pixel positions) to generate chroma prediction samples for the IBC-coded CU. For example, referring back to FIG. 5A, chroma samples (e.g., those inside the area 506) may be identified based on a fractional BV and the length of an applicable interpolation filter. The interpolation filter may be then applied to the chroma samples to derive chroma prediction samples for the IBC-coded CU. Various interpolation filters may be used to derive the chroma prediction samples. For example, a 4-tap chroma filter (e.g., as defined in the HEVC standard) may be used.

If fractional sample filtering for chroma components is enabled for the IBC mode, and if the current picture contains multiple slices and/or tiles, chroma reference samples located close to the boundaries between neighboring slices/tiles may not be available for interpolation filtering. This may be illustrated in FIG. 5B, which shows that a reference sample $P_0$ located outside a slice boundary 540 may not be available for fractional chroma sample interpolation. The circles in FIG. 5B may represent chroma samples at integer positions while the triangles may represent interpolated chroma samples with fractional pixel precision. One example reason that the reference sample $P_0$ may not be available to the chroma interpolation process may be that the reference sample is not in a same slice/tile as the current IBC-coded CU (e.g., the reference sample may be in a neighboring slice/tile). Another example reason may be that the slices/tiles in the current picture may be independently decodable. Another example reason may be that it may be a design goal to use reference samples from a previously coded area (e.g., an already decoded area of the current picture) to predict the current IBC-coded CU. Accordingly, chroma reference samples that may not be available for prediction may not be used for the fractional chroma sample interpolation of an IBC-coded CU. As described herein, a chroma sample may be considered to be available, for example, if it is from an area of the current picture that has already been decoded and if it belongs to a same slice or tile as the current CU.

An example chroma sample derivation process using the interpolation process described herein may be performed by conforming to one or more the following. For example, a luma motion vector mvLX may comply with certain bitstream conformance constraints when the reference picture is the current picture. An example constraint is that variables xRef and yRef may be derived based on Equations 5 and 6. When the derivation process for z-scan order block availability is invoked with (xCurr, yCurr) (e.g., which may be set equal to (xCb, yCb)), and the neighboring luma location (xNbY, yNbY) (e.g., which may be set equal to (xRef, yRef)) as inputs, the output may be equal to TRUE.

$$xRef=(mvLX[0]\%(1<<(1+SubWidthC))==0)?(xPb+(mvLX[0]>>2)):(xPb+(mvLX[0]>>2)-1) \quad (5)$$

$$yRef=(mvLX[1]\%(1<<(1+SubHeightC))==0)?(yPb+(mvLX[1]>>2)):(yPb+(mvLX[1]>>2)-1) \quad (6)$$

An example bitstream conformance constraint may be that the variables xRef and yRef may be modified according to Equations 7 and 8. When the derivation process for z-scan order block availability is invoked with (xCurr, yCurr) (e.g., which may be set equal to (xCb, yCb)), and the neighbouring luma location (xNbY, yNbY) (e.g., which may be set equal to (xRef, yRef)) as inputs, the output may be equal to TRUE.

$$xRef=(mvLX[0]\%(1<<(1+SubWidthC))==0)?(xPb+ (mvLX[0]>>2)+nPbW-1):(xPb+(mvLX[0]>>2)+ nPbW+1) \quad (7)$$

$$yRef=(mvLX[1]\%(1<<(1+SubHeightC))==0)?(yPb+ (mvLX[1]>>2)+nPbH-1):(yPb+(mvLX[1]>>2)+ nPbH+1) \quad (8)$$

An example bitstream conformance constraint may be that one or more of the following conditions may be true. First, the value of (mvLX[0]>>2)+nPbW+((mvLX[0]% (1<<(1+SubWidthC))==0)? 0:2)+xB1 may be less than or equal to 0. Second, the value of (mvLX[1]>>2)+nPbH+ ((mvLX[1]% (1<<(1+SubHeightC))==0)? 0:2)+yB1 may be less than or equal to 0. Third, the value of xRef/CtbSizeY−xCurr/CtbSizeY may be less than or equal to the value of yCurr/CtbSizeY−yRef/CtbSizeY.

One or more of the bitstream conformance constraints described herein may be enforced by an encoder (e.g., the encoder 100) and/or a decoder (e.g., the decoder 200). An encoder may encode a video into a bitstream in compliance with one or more of the constraints. A decoder may check whether a constraint is met before and/or during decoding of a bitstream, and an error may be generated if the constraint is not complied with.

As described herein, a reference sample may not be available for the fractional chroma interpolation process, for example, if the reference sample belongs to another slice/tile (e.g., other than the current slice/tile) or has not been decoded. In those situations, padded samples from the current slice/tile or decoded region may be used for the fractional chroma interpolation process. This is illustrated in FIG. 5C, which shows an example of cross-slice-boundary sample padding. The circles in FIG. 5C may represent chroma samples at integer positions while the triangles may represent chroma samples at fractional positions. As shown, integer samples $P_0$ may be across the slice boundary 550 and thus unavailable for chroma interpolation. To enable the chroma interpolation process, the values of integer samples $P_1$ may be replicated to the integer samples $P_0$.

Reference samples used for interpolation-based chroma derivation (e.g., for IBC-coded CUs) may be from an invalid region (e.g., a region that has not been decoded, a different slice or tile, etc.). As such, verification may be performed, for example, to check whether a BV uses unavailable chroma reference samples. The verification may bring complexities to the encoder and/or the decoder (e.g., in addition to complexities that may result from the chroma interpolation process itself). As described herein, a BV (e.g., for chroma samples) with fractional pixel precision may be clipped to a nearby (e.g., the nearest) integer chroma sample with equal or smaller horizontal and vertical coordinates. Referring back to FIG. 5A, the chroma samples 516a, 516b, 516c, 516d may be integer chroma samples obtained through BV clipping. These samples, however, may not necessarily be the best references for predicting the chroma samples of the current coding unit 502. For example, there may be other integer chroma samples that are from the same block as the corresponding luma components and/or are closer to the current coding unit 502.

Figure 5D:
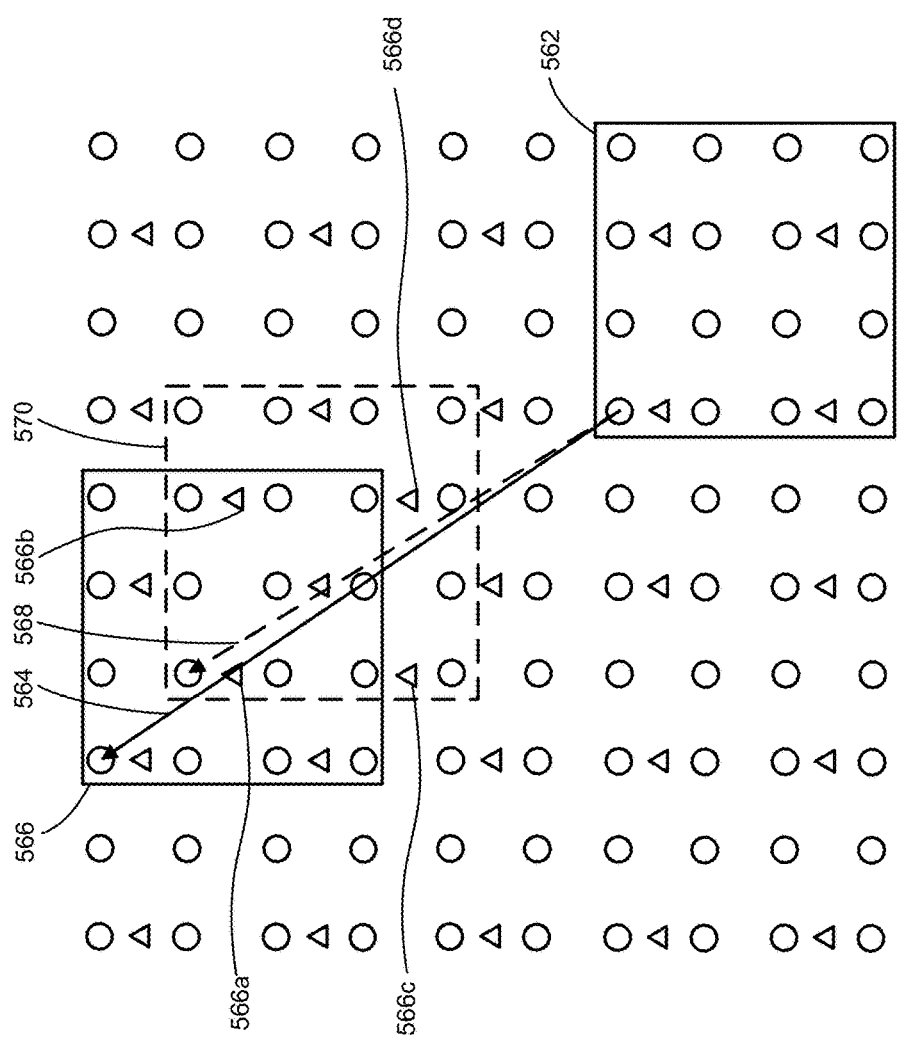
FIG. 5D is a diagram illustrating an example BV clipping operation for chroma components.

FIG. 5D illustrates the effect of BV clipping (e.g., in a motion compensation process) using an example clipping method. A current coding unit 562 may have a block size of 4×4 and the video sequence may be captured in a 4:2:0 chroma format. The luma and chroma samples may be represented by circles and triangles, respectively. An original BV 564 may point to a first reference block 566 while a clipped BV 568 may point to a second reference block 570. Using the example clipping method, a set of integer chroma samples may be derived (e.g., 566a, 566b, 566c, 566d in FIG. 5D). The integer chroma samples derived from the example clipping method may include one or more chroma samples (e.g., 566a, 566b shown in FIG. 5D) that are from the same block as the corresponding luma samples. Further, the integer chroma samples 566a, 566b, 566c, 566d in FIG. 5D may be close to the current coding unit. The integer chroma samples produced by the example BV clipping method may be used to predict the current coding unit.

A tradeoff between IBC prediction efficiency and complexity may be achieved during the retrieval of chroma reference samples for an IBC-coded coding unit. More specifically, for a given slice, if a picture with an index refIdx from a reference picture list LX (e.g., where X may be 0 or 1) is not the current picture, Equations 9 and 10 may be used; if the picture with the index refIdx from the reference picture list LX is the current picture, Equations 11 and 12 may be used.

$$mvCLX[0]=mvLX[0]*2/SubWidthC \quad (9)$$

$$mvCLX[1]=mvLX[1]*2/SubHeightC \quad (10)$$

$$mvCLX[0]=sign(mvLX[0])*(abs(mvLX[0])>>(1+ SubWidthC))*8 \quad (11)$$

$$mvCLX[1]=sign(mvLX[1])*(abs(mvLX[1])>>(1+ SubHeightC))*8 \quad (12)$$

Signaling for the IBC mode may be unified with that for the inter mode. For example, an IBC-coded CU in a current picture may be signaled as an inter-coded CU by adding a pseudo reference picture into the reference picture lists of the current picture. The pseudo reference picture may a decoded version of the current picture. The pseudo reference picture may comprise, for example, previously reconstructed samples of the current picture (e.g., before in-loop filtering is applied to the reconstructed samples). When the IBC mode is enabled (e.g., by setting a flag curr_pic_as_ref_enabled_flag to true), a reference picture list (e.g., reference picture list L0) of the current picture may be constructed in a specific order (e.g., one or more temporal reference pictures before the current picture, one or more temporal reference pictures after the current picture, and the pseudo reference picture (referred to herein as "currPic")). The pseudo reference picture may be inserted into the reference picture list through a reference picture list modification operation. The pseudo reference picture may be used to determine whether the IBC mode is enabled. More specifically, the IBC mode may be determined to be enabled if a decoded version of the current picture is included (e.g., as the pseudo reference picture) in the reference picture list L0 (e.g., after reference picture list modification).

An additional reference picture buffer may be created (e.g., in a decoded picture buffer (DPB)) to store previously reconstructed samples of the current picture prior to in-loop filtering (e.g., de-blocking and/or sample adaptive offset (SAO)). Memory access operations may be performed to write/read the samples into/from the reference picture buffer. Modifications to a current reference picture list may be signaled in a slice segment header. Different slices in a given picture may use different reference pictures. For example, some slices may use the pseudo reference picture (e.g., when the IBC mode is enabled) while other slices may not use the pseudo reference picture (e.g., when the IBC mode is disabled). During decoding of a current slice, information about the reference picture lists for future slices of the same picture may be unknown. As such, memory may be accessed (e.g., during both encoding and decoding) to write samples (e.g., unfiltered samples) into the buffer memory prior to in-loop filtering (e.g., even if the IBC mode is not enable for any slice in the current picture). Coding efficiency may be affected as a result of the foregoing operation, as the stored samples of the current picture might not be used (e.g., might never be used) as references in the IBC mode.

A flag (e.g., the curr_pic_as_ref_enabled_flag described herein) may be set (e.g., to TRUE) to signal that the slices referring to a given sequence parameter set (SPS) may be allowed to use a pseudo reference picture. The pseudo reference picture may include previously decoded samples of the current picture (e.g., prior to invoking in-loop filtering). The pseudo reference picture may be used as a reference picture for prediction (e.g., in the IBC mode). When the flag (e.g., the curr_pic_as_ref_enabled_flag) is set to true, a storage buffer may be allocated to store the pixel values prior to de-blocking and sample adaptive offset of the current picture.

Whether a pseudo reference picture is included in the final reference picture list of the current picture may be decided after the reference picture list modification process for the current slice is completed. If the pseudo reference picture is not included, the IBC mode may be disabled (e.g., completely disabled) at the slice level. On the decoder side, memory access operations associated with the IBC mode may be skipped if the decoder receives a picture-level indication that one or more slices (e.g., all of the slices) of the current picture may not use the pseudo reference picture as references. Such an indication may allow the decoder to make an early decision regarding whether to allocate a buffer to store the pseudo reference picture.

A flag (e.g., use_curr_pic_as_ref_flag) may be used in the slice segment header to indicate if the current picture is included in any reference picture list of the current slice. A bit-stream conformance constraint may be added to ensure that the value of this additional flag remain the same for one or more slices (e.g., all slices) of a given picture. Table 1 shows example slice segment header syntax that uses the additional flag.

TABLE 1

Example Slice Segment Header Syntax

| | Descriptor |
|---|---|
| slice_segment_header( ) { | |
| ... ... | |
|   if( !dependent_slice_segment_flag ) { | |
|     if(curr_pic_as_ref_enabled_flag) | |
|       use_curr_pic_as_ref_flag | u(1) |
| ...... | |
|   } | |
|   byte_alignment( ) | |
| } | |

When the flag (e.g., use_curr_pic_as_ref_flag) is set equal to 1, it may indicate that a decoded version of the current picture is included in reference picture list L0 of the current slice. When the additional flag is set equal to 0, it may indicate that a decoded version of the current picture is not included in any reference picture list of the current slice. When the additional flag is not present, it may be treated as if the flag were set equal to 0.

For purposes of bitstream conformance, the value of the flag may be set to a same value for one or more slices (e.g., all slices) associated with a given picture. An example reference picture list construction process in accordance with the approach described herein may be shown in Table 2. An example construction process for the reference picture list L0 (e.g., RefPicList0) may be shown in Table 3.

TABLE 2

Example Reference Picture List Construction Process

```
rIdx = 0
while( rIdx < NumRpsCurrTempList0 ) {
    for( i = 0; i < NumPocStCurrBefore && rIdx <
    NumRpsCurrTempList0;
    rIdx++, i++ )
        RefPicListTemp0[ rIdx ] = RefPicSetStCurrBefore[ i ]
    for( i = 0; i < NumPocStCurrAfter &&
    rIdx <NumRpsCurrTempList0; rIdx++, i++ )
        RefPicListTemp0[ rIdx ] = RefPicSetStCurrAfter[ i ]
    for( i = 0; i < NumPocLtCurr && rIdx < NumRpsCurrTempList0;
    rIdx++, i++ )
        RefPicListTemp0[ rIdx ] = RefPicSetLtCurr[ i ]
    if( use_curr_pic_as_ref_flag )
        RefPicListTemp0[ rIdx++ ] = currPic
}
```

TABLE 3

Example Reference Picture List L0 Construction Process

```
for( rIdx = 0; rIdx <= num_ref_idx_l0_active_minus1; rIdx++)
    RefPicList0[ rIdx ] = ref_pic_list_modification_flag_l0 ?
    RefPicListTemp0[ list_entry_l0[ rIdx ] ] : RefPicListTemp0[ rIdx]
```

A bit-stream conformance constraint may be imposed for reference picture list construction (e.g., without using the syntax described in Tables 2 and 3) when the IBC mode is enabled in SPS. Under the constraint, the reference picture lists of one or more slices (e.g., of all slices) in a given picture may behave consistently in terms of whether a pseudo reference picture is to be included in the reference picture lists. A decoder (e.g., the decoder 200) may, upon receiving the bit-stream of a slice in the given picture, evaluate the likelihood that the IBC mode may be applied to other slices of the same picture by checking whether a pseudo picture is included in the reference picture lists. For example, if the slice header indicates that a pseudo picture is not included in the reference picture lists, the decoder may decide to skip one or more memory access operations (e.g., all memory access operations) associated with the writing/reading of the samples of the current picture.

As described herein, the IBC mode may be enabled for a current picture by adding a pseudo reference picture (e.g., a decoded version of the current picture prior to in-loop filtering) into reference picture list L0 of the current picture. The pseudo reference picture may also be included in reference picture list L1 of the current picture (e.g., in certain bi-prediction use cases). Bi-prediction may be enabled, for example, by combining the prediction signals of two reference pictures, one from reference picture list L0 and the other from reference picture list L1. If bi-prediction is enabled and if the pseudo reference picture is included only in reference picture list L0, reference blocks from the pseudo reference picture may be combined with those of a temporal reference picture in L1, but may not be combined with those of other reference pictures (e.g., non-pseudo reference pictures) in L0. Coding gain for IBC-coded CUs may affected as a result.

When the IBC mode is enabled, the initial reference picture lists of the current picture may be generated by adding a pseudo reference picture into both reference picture list L0 and reference picture list L1 (e.g., for B-slices). The reference picture list construction process may be illustrated as follows. Table 4 and Table 5 show example syntax for constructing the reference picture list L0.

TABLE 4

Example Reference Picture List Construction Process

```
rIdx = 0
while( rIdx < NumRpsCurrTempList0 ) {
    for( i = 0; i < NumPocStCurrBefore && rIdx <
    NumRpsCurrTempList0; rIdx++, i++ )
        RefPicListTemp0[ rIdx ] = RefPicSetStCurrBefore[ i ]
    for( i = 0; i < NumPocStCurrAfter && rIdx <
    NumRpsCurrTempList0; rIdx++, i++ )
        RefPicListTemp0[ rIdx ] = RefPicSetStCurrAfter[ i ]
    for( i = 0; i < NumPocLtCurr && rIdx < NumRpsCurrTempList0;
    rIdx++, i++ )
        RefPicListTemp0[ rIdx ] = RefPicSetLtCurr[ i ]
    if( curr_pic_as_ref_enabled_flag )
        RefPicListTemp0[ rIdx++ ] = currPic
}
```

TABLE 5

Example Reference Picture List Construction Process

```
for( rIdx = 0; rIdx <= num_ref_idx_l0_active_minus1; rIdx++)
    RefPicList0[ rIdx ] = ref_pic_list_modification_flag_l0 ?
    RefPicListTemp0[ list_entry_l0[rIdx ] ] : RefPicListTemp0[ rIdx]
```

Table 6 shows example syntax for constructing the list RefPicListTemp1 when a slice is a B slice. In the example syntax, the variable NumRpsCurrTempList1 may be set equal to Max(num_ref_idx_l1_active_minus1+1, NumPicTotalCurr).

TABLE 6

Example Reference Picture List Construction Process

```
rIdx = 0
while( rIdx < NumRpsCurrTempList1 ) {
    for( i = 0; i < NumPocStCurrAfter && rIdx <
    NumRpsCurrTempList1; rIdx++, i++ )
        RefPicListTemp1[ rIdx ] = RefPicSetStCurrAfter[ i ]
    for( i = 0; i < NumPocStCurrBefore && rIdx <
    NumRpsCurrTempList1; rIdx++, i++ )
        RefPicListTemp1[ rIdx ] = RefPicSetStCurrBefore[ i ]
    for( i = 0; i < NumPocLtCurr && rIdx < NumRpsCurrTempList1;
    rIdx++, i++ )
        RefPicListTemp1[ rIdx ] = RefPicSetLtCurr[ i ]
    if( curr_pic_as_ref_enabled_flag )
        RefPicListTemp1[ rIdx++ ] = currPic
}
```

The list RefPicList1 may be constructed using the example syntax in Table 7.

TABLE 7

Example Reference Picture List Construction Process

```
for( rIdx = 0; rIdx <= num_ref_idx_l1_active_minus1; rIdx++)
    RefPicList1[ rIdx ] = ref_pic_list_modification_flag_l1 ?
    RefPicListTemp1[ list_entry_l1[ rIdx ] ] : RefPicListTemp1[ rIdx]
```

If a pseudo reference picture is included in both reference picture lists L0 and L1, two prediction blocks from the pseudo reference picture may be combined for CUs that are coded using the bi-prediction mode. However, bi-prediction between two reference blocks that are both from the pseudo reference picture may occur (although the block vectors may be different). Such bi-prediction may affect coding efficiency. A bitstream conformance constraint may be used to prevent combining two reference blocks from the pseudo reference picture.

An IBC-coded CU in a current picture may be distinguished from an inter-coded CU based at least on a picture order count (POC) of the current picture and a picture order count of a reference picture used for coding. More specifically, if the reference picture has a same POC as the current picture, a determination may be made that the current CU is coded in the IBC mode; otherwise, a determination may be made that the current CU is coded in the inter mode.

In certain embodiments, whether the IBC mode is enabled may be determined based on additional criteria. For instance, respective layer identifiers (IDs) associated with the current picture and the reference picture may be compared (e.g., in addition to comparing the POCs) to determine whether the IBC mode is enabled. As an example, under the scalable extension of HEVC (SHVC), an inter-layer reference picture from a neighboring layer may be used to predict the current picture. Similarly, under the 3D/Multiview extension of HEVC, an inter-view reference picture from a neighboring view at the same time instant may be used to predict the current picture. In either of those example scenarios, a reference picture used for inter prediction may have a same POC as the current picture, but with a different layer ID. Accordingly, to distinguish an IBC-coded CU from an inter-coded CU, the layer ID associated with a reference picture may be compared with the layer ID associated with the current picture (e.g., in addition to comparing the POCs of the pictures) to determine whether the IBC mode is enabled. More specifically, if the reference picture and the current picture have the same POC and the same layer ID, a determination may be made that the current CU is coded in the IBC mode.

A pseudo reference picture may generally be treated like a temporal reference picture. Some differences, however, may exist between the treatments of the two types of reference pictures. An example difference is that a pseudo reference picture may be marked as a long-term reference picture before coding (e.g., encoding and/or decoding) of the current picture is completed. Once the coding of the current picture is completed, the coded picture (e.g., after in-loop filtering) may be stored in the decoded picture buffer (e.g., if the picture is marked as a reference picture for coding future pictures), and the pseudo reference picture may be replaced by the coded current picture (e.g., after in-loop filtering has been applied) and marked as a short-term reference picture in the decoded picture buffer. An example difference may be that a pseudo reference picture may not be used as a collocated reference picture for temporal motion vector prediction (TMVP) in some cases. An example difference may be that, at a random access point (RAP), one or more temporal reference pictures (e.g., all temporal reference pictures) may be removed from the decoded picture buffer, while the pseudo reference picture for the current picture may still be maintained.

Certain video signals (e.g., camera-captured video signals) may contain illumination changes such as fade-in, fade-out, cross-fade, dissolve, flashes, etc. These illumination changes may occur locally (e.g., within a region of a picture) or globally (e.g., within the entire picture). Weighted prediction (WP) may be used to code video sequences with illumination variations such as fading and dissolving (e.g., among temporal neighboring pictures). In an example implementation of weighted prediction, an inter-predicted video block may be predicted using weighted samples from one or more temporal references, e.g., in accordance with in a linear relationship, as expressed in Equation 13.

$$WP(x,y) = w \cdot P(x,y) + o \qquad (13)$$

P(x, y) and WP(x, y) may be predicted pixel values at location (x, y) before and after weighted prediction, respectively, and w and o may be the weight and offset used in the weighted prediction. In a bi-prediction use case, weighted prediction may be performed from a linear combination of two temporal prediction signals as illustrated by Equation 14.

$$WP(x,y) = (w_0 \cdot P_0(x,y) + w_1 \cdot P_1(x,y) + o_0 + o_1)/2 \qquad (14)$$

$P_0(x, y)$ and $P_1(x, y)$ may be the first and second prediction blocks before weighted prediction, WP(x, y) may be the bi-predictive signal after weighted prediction, $w_0$ and $w_1$ may be the weights for each prediction block, and $o_0$ and $o_1$ may be the offsets for each prediction block.

The parameters associated with weighted prediction may be signaled in a slice header (e.g., different slices in a given picture may use different weights and offsets to generate reference blocks for temporal prediction). For an IBC-coded CU (e.g., that signaled as an inter-coded CU), weighted prediction may be applied using prediction signals obtained from the same picture (e.g., the pseudo reference picture described herein).

Weighted prediction for an IBC-coded CU may be disabled in various ways. For example, a flag associated with weighted prediction (e.g., luma_weight_1x_flag and/or chroma_weight_1x_flag) may be set (e.g., to false or zero) during signaling (e.g., in a video bitstream) to indicate that weighted prediction has not been applied for an IBC-coded CU. For example, weighted prediction-related flags may be skipped during the signaling process (e.g., the flags may not be sent in the video bitstream) of an IBC-coded CU. The absence of weighted prediction-related flags may serve as an indicator that weighted prediction is disabled. Whether the IBC mode is enabled for a coding unit of a current picture may be determined based on characteristics of the current picture and/or of a reference picture associated with the current picture. For example, as described herein, if the picture order counts of the current picture and the reference picture have a same value, a determination may be made that the IBC mode is applied to a current CU (e.g., because the reference picture may be determined to be the pseudo reference picture as described herein). Weighted prediction may then be disabled for the IBC-coded CU. If the picture order counts of the current picture and the reference picture have different values, a determination may be made that the inter mode is applied to the current CU. Weighted prediction may then be enabled for the inter-coded CU. In certain embodiments, the layer IDs associated with the current picture and the reference picture may be further compared to determine whether the IBC mode is applied and/or whether weighted prediction should be enabled. More specifically, if the reference picture and the current picture have the same POC value and the same layer ID value, a determination may be made that the IBC mode is applied and that weighted prediction may be disabled. If either the POC values or the layer IDs are different, a determination may be made that the inter mode is applied and that weighted prediction may be enabled.

Table 8 shows first example syntax for handling weighted prediction with which signaling of weighted prediction parameters may be disabled if the picture order counts of a current picture and a reference picture associated with the current picture are the same. The syntax may be included in a slice segment header. As shown, if a flag luma_weight_l0_flag[i] is set equal to 1, the indication may be that weighting factors for predicting the luma components of reference picture list L0 using RefPicList0[i] may be present. If the flag luma_weight_l0_flag[i] is set equal to 0, the indication may be that the relevant weighting factors may not be present. If the flag luma_weight_l0_flag[i] is not present, the indication may be that processing should proceed as if the flag had a value of 0. If a flag luma_weight_l1_flag[i] is set equal to 1, the indication may be that weighting factors for predicting the luma components of reference picture list L1 using RefPicList1 [i] may be present. If the flag luma_weight_l1_flag[i] is set equal to 0, the indication may be that those weighting factors may not be present. If the flag luma_weight_l1_flag[i] is not present, the indication may be that processing should proceed as if the flag had a value of 0.

TABLE 8

Example Weighted Prediction Parameters Syntax in a Slice Segment Header

|  | Descriptor |
|---|---|
| pred_weight_table( ) { |  |
|     luma_log2_weight_denom | ue(v) |
|     if( ChromaArrayType != 0 ) |  |
|         delta_chroma_log2_weight_denom | se(v) |
|     for( i = 0; i <= num_ref_idx_l0_active_minus1; i++ ) |  |
|         if( PicOrderCnt(RefPicList0[i]) != PicOrderCnt(CurrPic) ) |  |
|             luma_weight_l0_flag[ i ] | u(1) |
|     if( ChromaArrayType != 0 ) |  |
|         for( i = 0; i <= num_ref_idx_l0_active_minus1; i++ ) |  |
|             if( PicOrderCnt(RefPicList0[i]) != PicOrderCnt(CurrPic) ) |  |
|                 chroma_weight_l0_flag[ i ] | u(1) |
|     for( i = 0; i <= num_ref_idx_l0_active_minus1; i++ ) { |  |
|         if( luma_weight_l0_flag[ i ] ) { |  |
|             delta_luma_weight_l0[ i ] | se(v) |
|             luma_offset_l0[ i ] | se(v) |
|         } |  |
|         if( chroma_weight_l0_flag[ i ] ) |  |
|             for( j = 0; j < 2; j++ ) { |  |
|                 delta_chroma_weight_l0[ i ][ j ] | se(v) |
|                 delta_chroma_offset_l0[ i ][ j ] | se(v) |
|             } |  |
|     } |  |
|     if( slice_type = = B ) { |  |
|         for( i = 0; i <= num_ref_idx_l1_active_minus1; i++ ) |  |
|             if( PicOrderCnt(RefPicList1[i]) != PicOrderCnt(CurrPic) ) |  |
|                 luma_weight_l1_flag[ I ] | u(1) |
|         if( ChromaArrayType != 0 ) |  |
|             for( i = 0; i <= num_ref_idx_l1_active_minus1; i++ ) |  |
|                 if( PicOrderCnt(RefPicList1[i]) != PicOrderCnt(CurrPic) ) |  |
|                     chroma_weight_l1_flag[ i ] | u(1) |
|         for( i = 0; i <= num_ref_idx_l1_active_minus1; i++ ) { |  |
|             if( luma_weight_l1_flag[ i ] ) { |  |
|                 delta_luma_weight_l1[ i ] | se(v) |
|                 luma_offset_l1[ i ] | se(v) |
|             } |  |
|             if( chroma_weight_l1_flag[ i ] ) |  |

TABLE 8-continued

Example Weighted Prediction Parameters
Syntax in a Slice Segment Header

|  | Descriptor |
|---|---|
| for( j = 0; j < 2; j++ ) { | |
|     delta_chroma_weight_l1[ i ][ j ] | se(v) |
|     delta_chroma_offset_l1[ i ][ j ] | se(v) |
| } | |
| } | |
| } | |
| } | |

Table 9 shows second example syntax for handling weighted prediction with which signaling of weighted prediction parameters may be disabled if the picture order counts of a current picture and a reference picture associated with the current picture are the same and if the layer IDs of the current picture and the reference picture are also the same. In the example syntax, the function LayerIdCnt(refPic) may be used to obtain the layer ID of the reference picture refPic. The variable nuh_layer_id may represent the NAL layer ID of the current layer. The flag pps_curr_pic_ref_enabled_flag may be used to condition the signaling of the weighted prediction parameters.

TABLE 9

Example Weighted Prediction Parameters Syntax in a Slice Segment Header

|  | Descriptor |
|---|---|
| pred_weight_table( ) { | |
|   luma_log2_weight_denom | ue(v) |
|   if( ChromaArrayType != 0 ) | |
|     delta_chroma_log2_weight_denom | se(v) |
|   for( i = 0; i <= num_ref_idx_l0_active_minus1; i++ ) | |
|     if( !pps_curr_pic_ref_enabled_flag \|\| ( LayerIdCnt(RefPicList0[i] ) != | |
|       nuh_layer_id \|\| PicOrderCnt(RefPicList0[i] ) != | |
|       PicOrderCnt( CurrPic ) ) ) | |
|       luma_weight_l0_flag[ i ] | u(1) |
|   if( ChromaArrayType != 0 ) | |
|     for( i = 0; i <= num_ref_idx_l0_active_minus1; i++ ) | |
|       if( !pps_curr_pic_ref_enabled_flag \|\| ( LayerIdCnt(RefPicList0[i]) != | |
|         nuh_layer_id \|\| PicOrderCnt(RefPicList0[i]) != | |
|         PicOrderCnt(CurrPic) ) ) | |
|         chroma_weight_l0_flag[ i ] | u(1) |
|   for( i = 0; i <= num_ref_idx_l0_active_minus1; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for(j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if( slice_type = = B ) { | |
|     for( i = 0; i <= num_ref_idx_l1_active_minus1; i++ ) | |
|       if( !pps_curr_pic_ref_enabled_flag \|\| ( LayerIdCnt(RefPicList1[i]) != | |
|         nuh_layer_id \|\| PicOrderCnt(RefPicList1[i]) != | |
|         PicOrderCnt(CurrPic) ) ) | |
|         luma_weight_l1_flag[ I ] | u(1) |
|     if( ChromaArrayType != 0 ) | |
|       for( i = 0; i <= num_ref_idx_l1_active_minus1; i++ ) | |
|         if( !pps_curr_pic_ref_enabled_flag \|\| ( LayerIdCnt(RefPicList1[i]) | |
|           != nuh_layer_id \|\| PicOrderCnt(RefPicList1[i]) != | |
|           PicOrderCnt(CurrPic) ) ) | |
|         chroma_weight_l1_flag[ i ] | u(1) |
|     for( i = 0; i <= num_ref_idx_l1_active_minus1; i++ ) { | |
|       if( luma_weight_l1_flag[ i ] ) { | |
|         delta_luma_weight_l1[ i ] | se(v) |
|         luma_offset_l1[ i ] | se(v) |
|       } | |
|       if( chroma_weight_l1_flag[ i ] ) | |
|         for( j = 0; j < 2; j++ ) { | |
|           delta_chroma_weight_l1[ i ][ j ] | se(v) |
|           delta_chroma_offset_l1[ i ][ j ] | se(v) |
|         } | |
|     } | |
|   } | |
| } | |

The example syntax shown in Table 9 may be further simplified. For example, the reference picture may have the same POC and the same layer_id as the current picture when the IBC mode is enabled in the picture parameter set (PPS) (e.g., the flag pps_curr_pic_ref_enabled_flag is set to 1). Accordingly, the flag pps_curr_pic_ref_enabled_flag may be removed from signaling and the simplified syntax may be represented in Table 10.

otherwise (e.g., the reference picture is from the same layer as the current picture), the coding device may set the corresponding variable to 0 (or false). The information may be stored (e.g., in memory). Subsequently, when the coding device parses weighted prediction parameters (e.g., using the syntax table in Table 4), an additional condition based on the value of this binary variable may be added (e.g., in addition to POC value checking) to determine if signaling of the weighted prediction parameters may be skipped.

TABLE 10

Example Weighted Prediction Parameters Syntax in a Slice Segment Header

|  | Descriptor |
|---|---|
| pred_weight_table( ) { |  |
|   luma_log2_weight_denom | ue(v) |
|   if( ChromaArrayType != 0 ) |  |
|     delta_chroma_log2_weight_denom | se(v) |
|   for( i = 0; i <= num_ref_idx_l0_active_minus1; i++ ) |  |
|     if( LayerIdCnt(RefPicList0[i]) != nuh_layer_id \|\| |  |
|         PicOrderCnt(RefPicList0[i]) != PicOrderCnt(CurrPic) ) |  |
|       luma_weight_l0_flag[ i ] | u(1) |
|   if( ChromaArrayType != 0 ) |  |
|     for( i = 0; i <= num_ref_idx_l0_active_minus1; i++ ) |  |
|       if( LayerIdCnt(RefPicList0[i]) != nuh_layer_id \|\| |  |
|           PicOrderCnt(RefPicList0[i]) != PicOrderCnt(CurrPic) ) |  |
|         chroma_weight_l0_flag[ i ] | u(1) |
|   for( i = 0; i <= num_ref_idx_l0_active_minus1; i++ ) { |  |
|     if( luma_weight_l0_flag[ i ] ) { |  |
|       delta_luma_weight_l0[ i ] | se(v) |
|       luma_offset_l0[ i ] | se(v) |
|     } |  |
|     if( chroma_weight_l0_flag[ i ] ) |  |
|       for( j = 0; j < 2; j++ ) { |  |
|         delta_chroma_weight_l0[ i ][ j ] | se(v) |
|         delta_chroma_offset_l0[ i ][ j ] | se(v) |
|       } |  |
|   } |  |
|   if( slice_type == B ) { |  |
|     for( i = 0; i <= num_ref_idx_l1_active_minus1; i++ ) |  |
|       if( LayerIdCnt(RefPicList1[i]) != nuh_layer_id \|\| |  |
|           PicOrderCnt(RefPicList1[i]) != PicOrderCnt(CurrPic) ) |  |
|         luma_weight_l1_flag[ I ] | u(1) |
|     if( ChromaArrayType != 0 ) |  |
|       for( i = 0; i <= num_ref_idx_l1_active_minus1; i++ ) |  |
|         if( LayerIdCnt(RefPicList1[i]) != nuh_layer_id \|\| |  |
|             PicOrderCnt(RefPicList1[i]) != PicOrderCnt(CurrPic) ) |  |
|           chroma_weight_l1_flag[ i ] | u(1) |
|     for( i = 0; i <= num_ref_idx_l1_active_minus1; i++ ) { |  |
|       if( luma_weight_l1_flag[ i ] ) { |  |
|         delta_luma_weight_l1[ i ] | se(v) |
|         luma_offset_l1[ i ] | se(v) |
|       } |  |
|       if( chroma_weight_l1_flag[ i ] ) |  |
|         for( j = 0; j < 2; j++ ) { |  |
|           delta_chroma_weight_l1[ i ][ j ] | se(v) |
|           delta_chroma_offset_l1[ i ][ j ] | se(v) |
|         } |  |
|     } |  |
|   } |  |
| } |  |

As illustrated in Table 9 and Table 10, the layer IDs of a reference picture associated with the current picture may be checked to determine if the reference picture is from the same layer as the current picture. Such a determination may also be made based on stored information (e.g., binary variables) about whether the reference picture is an inter-layer or inter-view reference picture. Such information may be derived during the reference picture list construction process. More specifically, while generating the reference picture lists, if a coding device (e.g., the decoder 200) determines that a reference picture is from a different layer than the current layer, the coding device may set a corresponding variable (e.g., a binary variable) to 1 (or true);

As described herein, when a video block is coded in the inter prediction mode, pixels from previously coded video pictures may be used to predict a current coding unit. Packet errors (e.g., due to packet losses during the transmission of compressed video bit-streams) may propagate between neighboring pictures (e.g., from a reference picture to the current picture). The propagation of errors may be due to, for example, temporal dependencies (e.g., in an error-prone environment). To mitigate the propagation of errors, intra-coded blocks may be introduced (e.g., periodically) to break the temporal dependencies. This technique may be referred to as "intra-refreshing". The intra-coded blocks may use previously coded pixels of neighboring blocks as prediction references. If those prediction references were coded using inter prediction, errors may propagate into the intra-coded blocks through the references.

Constrained intra prediction (CIP) is an intra prediction technique by which constraints may be imposed on the usage of neighboring blocks as reference blocks so as to enhance the accuracy of intra prediction. When CIP is enabled, the intra prediction of a current CU may use pixels of neighboring blocks that have been coded in either the intra mode or the IBC mode. The intra or IBC-coded neighboring blocks, however, may have been predicted using reference samples that themselves have been inter-predicted. As such, errors introduced during the inter prediction may propagate to the current CU.

Figure 6:
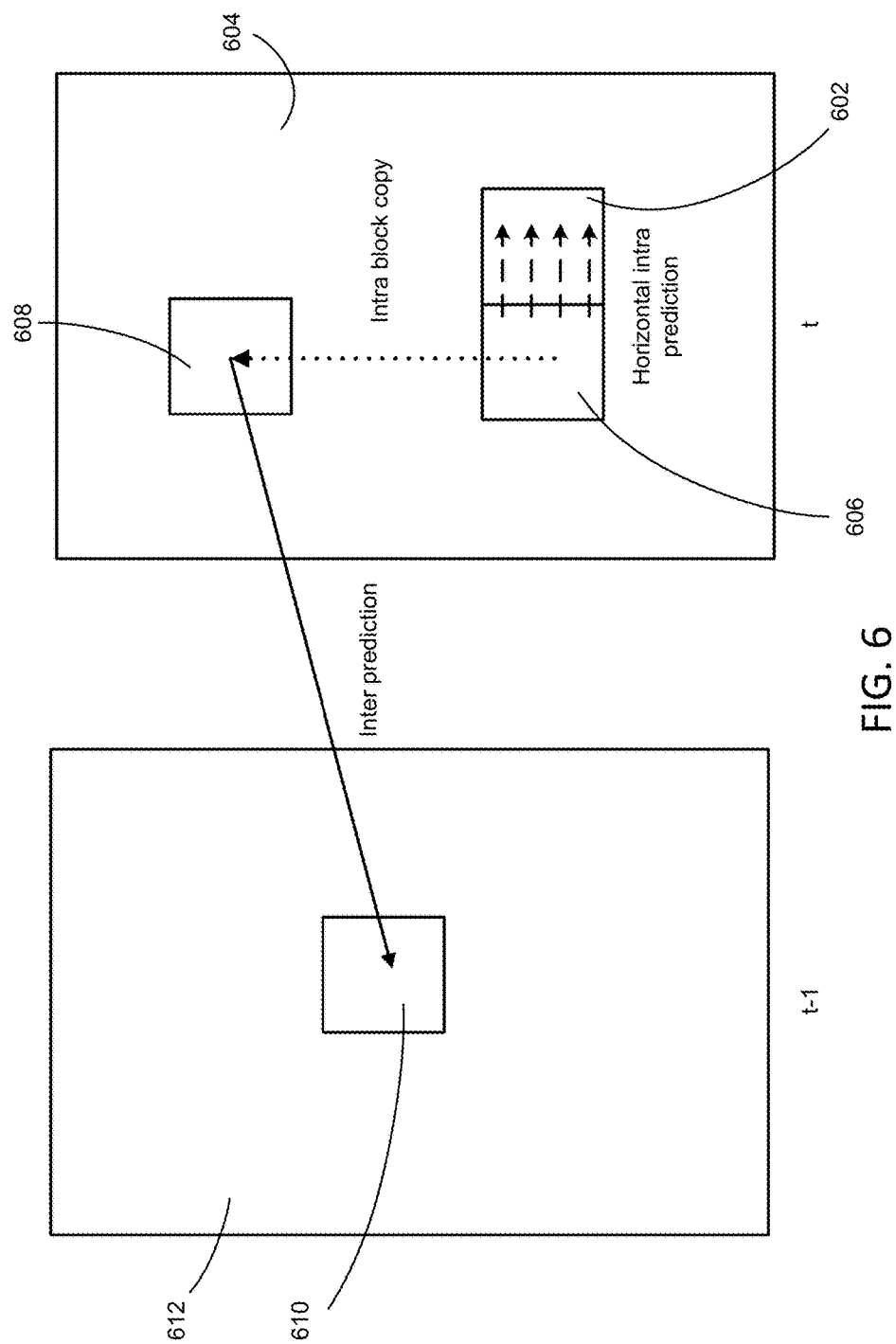
FIG. 6 is a diagram illustrating how errors may propagate from an inter-coded reference block to a current block being coded with constrained intra prediction (CIP).

FIG. 6 illustrates an example scenario in which errors may propagate from an inter-coded block to a current block being coded with CIP. In the example, a current CU 602 of a current picture 604 (e.g., at time t) is intra predicted using a horizontal intra prediction mode. The intra prediction may utilize pixels in a neighboring block 606 to the left of the current CU. The neighboring block 606 itself may have been predicted using the IBC mode (e.g., using pixels of a previously coded block 608 in the current picture 604). The reference block 608, however, may have been inter-coded using pixels (e.g., from block 610) of a reference picture 612 (e.g., at a previous time t−1). In such a scenario, errors from the reference picture 612 at (t−1) may propagate to the reference block 608 in the current picture 604. The errors may further propagate to the block 606, and then to the current CU 602. The propagation of errors may break CIP design goals (which may include prevention of error propagation from an inter-coded block to an intra-coded block).

Figure 7:
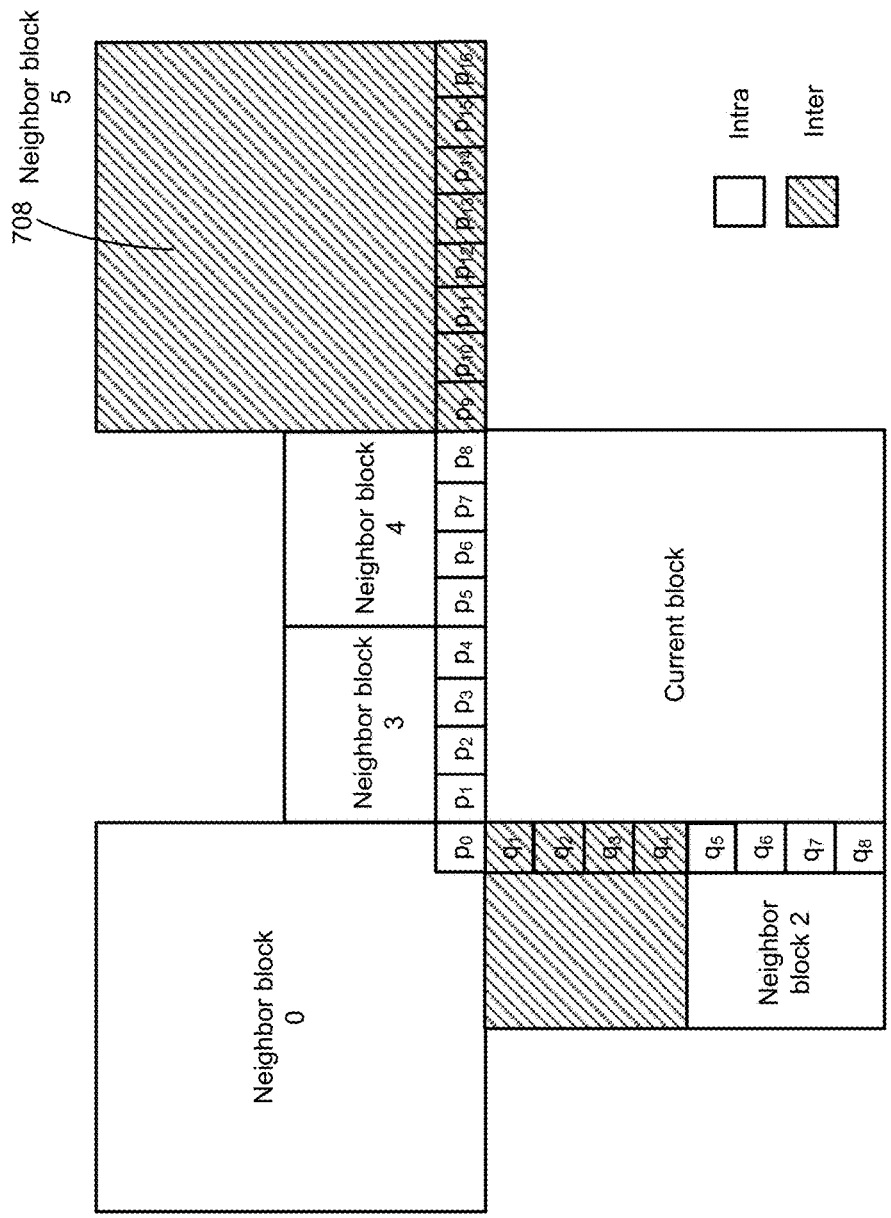
FIG. 7 is a diagram illustrating an example way of performing intra prediction when CIP is enabled.

CIP may be adapted to restrict prediction in such a manner that blocks being coded in the IBC mode may be predicted using intra or IBC-coded pixels. FIG. 7 illustrates how intra prediction may be performed as proposed when CIP is enabled. In the figure, pixels from neighboring inter-coded blocks are shown as blank squares while pixels from neighboring intra-coded blocks are shown as shaded squares. When CIP is enabled, restrictions (referred to herein as "CIP restrictions") may be applied under which intra prediction of a current block may use intra-coded neighboring samples and not inter-coded neighboring samples. When CIP is not enabled, the CIP restrictions may not be applicable.

One or more of the following approaches may be applied when CIP is enabled. In an example, the IBC mode may be disabled when CIP is enabled. For instance, the IBC mode may be disabled from a high level by setting a flag (e.g., setting the curr_pic_as_ref_enabled_flag to 0) in the Picture Parameter Set (PPS). In an example, only samples of intra-coded CUs may be allowed to be used as reference samples for intra prediction. Samples of neighboring inter-coded CUs (including inter-coded CUs that refer to a temporal reference picture and/or that refer to a pseudo reference picture) may not be used as reference samples for intra prediction. In an example, intra prediction may use IBC-coded CUs as references if the IBC-coded CUs themselves have used only intra-coded CUs as references. In this example, temporal motion vector prediction (TMVP) may be disabled for the IBC mode. In some embodiments, IBC-coded samples from a pseudo reference picture may not be allowed to predict intra-coded CUs. Accordingly, errors due to temporal BV prediction may be prevented from propagating into the intra-coded CUs and TMVP may be enabled for the IBC mode in those embodiments.

Intra-coded CUs may be allowed to use neighboring intra-coded samples. The intra-coded CUs may use neighboring IBC-coded samples under certain conditions. For example, the intra-coded CUs may use neighboring IBC-coded samples if those samples refer to intra-coded samples in previously coded areas of the current picture as references. Intra prediction of CUs based on neighboring samples that directly or indirectly refer to temporal reference pictures may be disallowed. TMVP may be disabled for the IBC mode.

The example approaches described herein may be applied as bit-stream conformance constraints. The example approaches described herein may be applied to multiple types of pictures. For example, the example approaches may be applied to pictures containing regular inter-coded CUs (e.g., inter-coded CUs predicted from temporal reference pictures). Some I-slices and P/B slices may include pseudo reference pictures and not temporal reference pictures in their reference picture lists. Thus, there may not be inter-coded CUs that refer to temporal references. As such, errors in previously decoded temporal reference pictures may be prevented from propagating into the current picture. Samples from previously reconstructed blocks may be used as reference samples for intra prediction.

The example approaches described herein may be applied (e.g., only applied) to I-slices and P/B-slices for which the respective reference picture lists may include a temporal reference picture. If a current slice is an I-slice or a P/B-slice for which the reference picture lists include only a pseudo reference picture (e.g., no temporal reference picture is included in the reference picture lists), intra-coded CUs and/or inter-coded CUs may be used as references for intra prediction. As described herein, whether the reference picture lists include only a pseudo reference picture may be determined by comparing the picture order count associated with the current picture with respective picture order counts associated with the reference pictures on the reference picture lists. If the picture order count associated with the current picture is the same as the respective picture order counts associated with each of the reference pictures, a determination may be made that one or more of the example approaches described herein may not be applied. If the current slice is a P/B-slice that uses a temporal reference picture for prediction, one or more of the constraints described herein may be applied. For example, the intra sample prediction process and temporal motion vector prediction derivation process may be performed as follows.

With respect to general intra sample prediction, the availability derivation process for a block in z-scan order may be invoked with a current luma location (xCurr, yCurr) set equal to (xTbY, yTbY). A neighboring luma location (xNbY, yNbY) may be used as an input. The output may be assigned to a variable denoted as availableN. A sample p[x][y] may be derived as follows. If one or both of the following conditions are true, the sample p[x][y] may be marked as not available for intra prediction. The first condition may be that the variable availableN is equal to FALSE (or zero). The second condition may be that the value of pictureCuPredMode[xNbY][yNbY] is not equal to MODE_INTRA, the value of DiffPicOrderCnt (aPic, CurrPic) is not equal to 0 for at least one picture aPic in the RefPicList0 and RefPicList1 of the current slice, and the value of constrained_intra_pred_flag is equal to 1 (or TRUE). If neither of the foregoing conditions is true, the sample p[x][y] may be marked as "available for intra prediction," and the sample at location (xNbCmp, yNbCmp) may be assigned to p[x][y].

With respect to the derivation process for temporal luma motion vector prediction, variables mvLXCol and availableFlagLXCol may be derived as follows. If slice_temporal_mvp_enabled_flag is equal to 0, both components of mvLXCol may be set equal to 0 and availableFlagLXCol may be set equal to 0. If the reference picture is the current picture and the constrained_intra_pred_flag is equal to 1, it may not be required to set both components of mvLXCol to 0 and to set availableFlagLXCol to 0.

The fourth example approach may be implemented as part of a decoder (e.g., the decoder 200) or decoding process. The decoder may consider the restrictions described in association with the fourth example approach when deciding whether a reference sample is available for intra prediction. If not all reference samples are available for intra prediction using a given prediction mode (e.g., DC, planar, and/or the 33 directional prediction modes), the intra prediction mode may not be applicable. Certain bit-stream conformance may be applied such that IBC-coded samples that refer to an intra-coded area of the current picture may be used for intra prediction. For example, a flag (e.g., constrained_intra_pred_flag) may be set equal to 0 to indicate that residual data and decoded samples of neighboring coding blocks may be used for intra prediction. With the flag set to zero, the decoded samples may have been coded with a reference picture that is not the current picture, or the decoded samples may have been coded without such a reference picture. The flag may be set to 1 to indicate that CIP may be enabled and that the intra prediction process may use residual data and decoded samples from neighboring coding blocks that have been coded without using a reference picture that is not the current picture. To illustrate, when the flag is set to 1 and a reference sample A is used for intra prediction, the reference sample A may not be predicted using a reference picture that is not the current picture. Further, in the foregoing example scenario, if the reference sample A is predicted using a reference sample B from the current picture, the reference sample B may also be coded using the intra prediction mode.

As described herein, at least two types of searches (e.g., full-frame IBC searches as shown in FIG. 3 and local IBC searches as shown in FIG. 4) may be conducted in the IBC mode. The range of an IBC search may impact the complexity of HEVC SCC codec. For example, a full-frame IBC search may be implemented to utilize off-chip memory to store unfiltered samples of a current picture. Such a way of storing data may be slow. A local IBC search may be implemented to utilize on-chip memory, which may be faster than using off-chip memory.

A constraint on the range of IBC searches may be imposed. For example, the maximum value of decoded BVs may be limited. More specifically, two separate values MaxHorizontalBV and MaxVerticalBV may be specified to restrict the respective maximum absolute values of horizontal and vertical BVs for the IBC mode. The two restrictions may be given a same value or different values. When set to different values, the two restrictions may enable accomplishment of different trade-offs between coding efficiency and decoding complexity (e.g., for different profiles). For conforming bit-streams, the absolute values of horizontal BV and vertical BV may be equal to or less than MaxHorizontalBV and MaxVerticalBV, respectively. The search range constraint may be applied as follows.

When the reference picture is the current picture, the luma motion vector mvLX may comply with the following constraints. The absolute value of (mvLX[0]>>2) may be less than or equal to MaxHorizontalBV. The absolute value of (mvLX[1]>>2) may be less than or equal to MaxVerticalBV. When the derivation process for z-scan order block availability is invoked with (xCurr, yCurr) set equal to (xCb, yCb), the neighboring luma location (xNbY, yNbY) set equal to (xPb+(mvLX[0]>>2), and (yPb+mvLX[1]>>2)) as inputs, the output may be equal to TRUE. When the derivation process for z-scan order block availability is invoked with (xCurr, yCurr) set equal to (xCb, yCb), the neighboring luma location (xNbY, yNbY) set equal to (xPb+(mvLX[0]>>2)+nPbW−1, and yPb+(mvLX[1]>>2)+nPbH−1) as inputs, the output may be equal to TRUE.

Syntax elements such as max_hor_block_vector_ibc and max_ver_block_vector_ibc may be signaled in a video parameter set (VPS), sequence parameter set or picture parameter set (PPS) to indicate the maximum absolute values of horizontal and vertical BVs. Table 11 shows an example of how the syntax elements described herein may be signaled.

TABLE 11

Example Syntax for Signaling BV Constraints

| | Descriptor |
|---|---|
| sps_scc_extension( ) { | |
|     curr_pic_as_ref_enabled_flag | u(1) |
|     palette_mode_enabled_flag | u(1) |
|     if( palette_mode_enabled_flag ) { | |
|         palette_max_size | ue(v) |
|         delta_palette_max_predictor_size | ue(v) |
|     } | |
|     motion_vector_resolution_control_idc | u(2) |
|     intra_boundary_filtering_disabled_flag | u(1) |
|     if(curr_pic_as_ref_enabled_flag) { | |
|         max_block_vector_present_flag | u(1) |
|         if( max_block_vector_present_flag ) { | |
|             max_hor_block_vector_ibc_minus_min_coding_block_size | ue(v) |
|             max_ver_block_vector_ibc_minus_min_coding_block_size | ue(v) |
|         } | |
|     } | |
| } | |

The variable max_block_vector_present_flag having a value of 1 may indicate that syntax elements max_hor_block_vector_ibc_minus_min_coding_block_size and max_ver_block_vector_ibc_minus_min_coding_block_size are present. The variable max_block_vector_present_flag having a value of 0 may indicate that syntax elements max_hor_block_vector_ibc_minus_coding_block_size and max_ver_block_vector_ibc_minus_coding_block_size are not present. When the variable max_block_vector_present_flag is not present, it may be treated as if the variable were present and had a value of 0.

The variable max_hor_block_vector_ibc_minus_min_coding_block_size plus MinCbSizeY may specify the maximum value for horizontal motion vectors for which the reference picture is a pseudo reference picture (e.g., currPic). When the variable max_hor_block_vector_ibc_minus_min_coding_block_size is not present, it may be inferred to be pic_width_in_luma_sample−MinCbSizeY. The value of max_hor_block_vector_ibc_minus_min_coding_block_size may be in the range of 0 to pic_width_in_luma_samples−MinCbSizeY, inclusive.

The variable max_ver_block_vector_ibc_minus_min_coding_block_size plus MinCbSizeY may specify the maximum value for vertical motion vectors for which the reference picture is a pseudo reference picture (e.g., currPic). When the variable max_ver_block_vector_ibc_minus_min_coding_block_size is not present, it is inferred to be pic_height_in_luma_samples−MinCbSizeY. The value of max_ver_block_vector_ibc_minus_min_coding_block_size may be in the range of 0 to pic_height_in_luma_samples−MinCbSizeY, inclusive.

The variables MaxHorizontalBV and MaxVerticalBV may be derived as follows. MaxHorizontalBV=max_hor_block_vector_ibc_minus_min_coding_block_size+MinCbSizeY. MaxVerticalBV=max_ver_block_vector_ibc_minus_min_coding_block_size+MinCbSizeY. Various coding algorithms may be used to code the maximum BV absolute values. For example, the two values may be coded using unsigned exponential Golomb code (ue). To reduce the signaling overhead of the relevant syntax, a constraint may be imposed to restrict the maximum absolute values of horizontal and vertical BVs to be a power of 2 such that their logarithmic values may be signaled (e.g., instead of the actual values). More specifically, instead of directly signaling max_hor_block_vector_ibc_minus_min_coding_block_size and max_ver_block_vector_ibc_minus_min_coding_block_size, two syntax elements log 2_max_abs_hor_block_vector_ibc_minus_min_coding_block_size and log 2_max_abs ver_block_vector_ibc_minus_min_coding_block_size may be signaled so that the values of MaxHorizontalBV and MaxVerticalBV may be derived. For example, using these logarithmic values, MaxHorizontalBV and MaxVerticalBV may be derived as (1<<log 2_max_abs_hor_block_vector_ibc_minus_min_coding_block_size)+MinCbSizeY and (1<<log 2_max_abs ver_block_vector_ibc_minus_min_coding_block_size)+MinCbSizeY, respectively. The maximum absolute values of horizontal and vertical block vectors may be restricted to multiples of two such that the quotients of the division by 2 operations may be signaled. For example, two syntax elements max_hor_block_vector_ibc_minus_min_coding_block_size_div 2 and max_ver_block_vector_ibc_minus_min_coding_block_size_div 2 may be signaled to derive the values of MaxHorizontalBV and MaxVerticalBV as (max_hor_block_vector_ibc_minus_min_block_size_div 2<<1)+MinCbSizeY and (maxs_ver_block_vector_ibc_minus_min_block_size_div 2<<1)+MinCbSizeY, respectively.

Figure 8A:
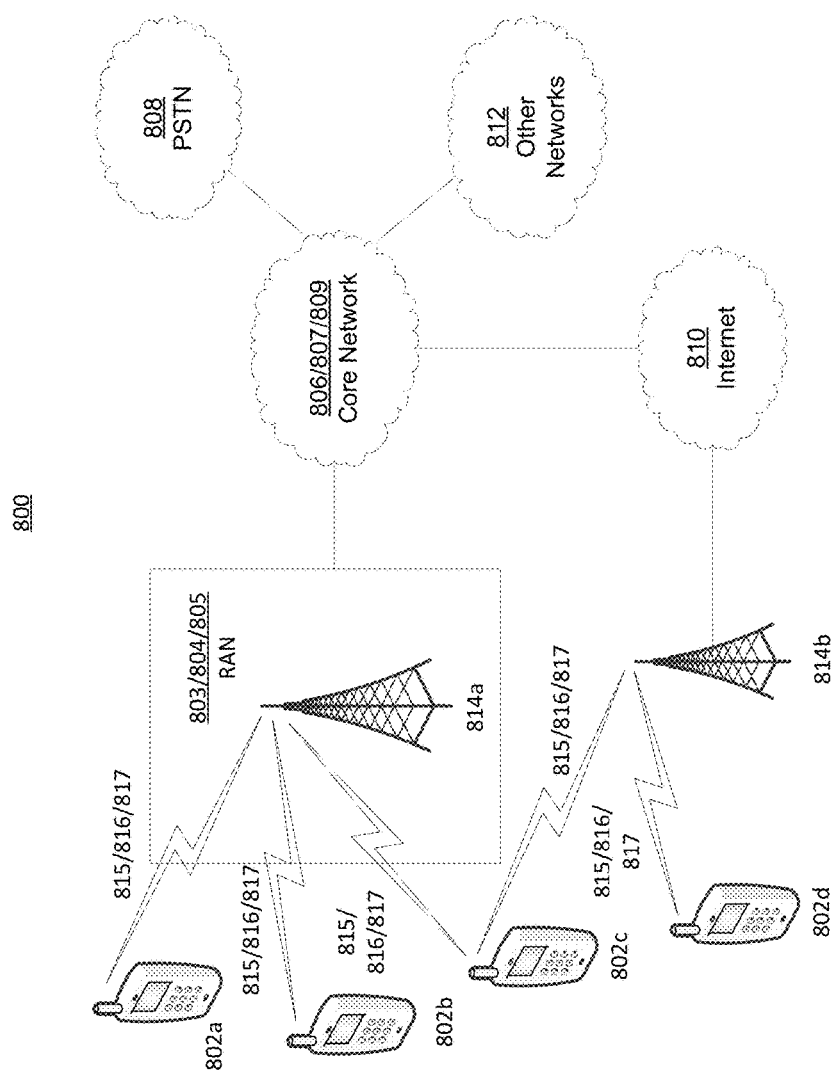
FIG. 8A depicts a diagram of an example communications system in which one or more disclosed embodiments may be implemented.

FIG. 8A is a diagram of an example communications system 800 in which one or more examples disclosed herein may be implemented. The communications system 800 may be a multiple access system that provides content, such as voice, data, video, messaging, broadcast, etc., to multiple wireless users. The communications system 800 may enable multiple wireless users to access such content through the sharing of system resources, including wireless bandwidth.

For example, the communications systems 800 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 8A, the communications system 800 may include wireless transmit/receive units (WTRUs) 802a, 802b, 802c, and/or 802d (which generally or collectively may be referred to as WTRU 802), a radio access network (RAN) 803/804/805, a core network 806/807/809, a public switched telephone network (PSTN) 808, the Internet 810, and other networks 812, though it will be appreciated that the disclosed embodiments contemplate any number of WTRUs, base stations, networks, and/or network elements. Each of the WTRUs 802a, 802b, 802c, 802d may be any type of device configured to operate and/or communicate in a wireless environment. By way of example, the WTRUs 802a, 802b, 802c, 802d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 800 may also include a base station 814a and a base station 814b. Each of the base stations 814a, 814b may be any type of device configured to wirelessly interface with at least one of the WTRUs 802a, 802b, 802c, 802d to facilitate access to one or more communication networks, such as the core network 806/807/809, the Internet 810, and/or the networks 812. By way of example, the base stations 814a, 814b may be a base transceiver station (BTS), a Node-B, an eNode B, a Home Node B, a Home eNode B, a site controller, an access point (AP), a wireless router, and the like. While the base stations 814a, 814b are each depicted as a single element, it will be appreciated that the base stations 814a, 814b may include any number of interconnected base stations and/or network elements.

The base station 814a may be part of the RAN 803/804/805, which may also include other base stations and/or network elements (not shown), such as a base station controller (BSC), a radio network controller (RNC), relay nodes, etc. The base station 814a and/or the base station 814b may be configured to transmit and/or receive wireless signals within a particular geographic region, which may be referred to as a cell (not shown). The cell may further be divided into cell sectors. For example, the cell associated with the base station 814a may be divided into three sectors. Thus, in one embodiment, the base station 814a may include three transceivers, i.e., one for each sector of the cell. In another embodiment, the base station 814a may employ multiple-input multiple output (MIMO) technology and, therefore, may utilize multiple transceivers for each sector of the cell.

The base stations 814a, 814b may communicate with one or more of the WTRUs 802a, 802b, 802c, 802d over an air interface 815/816/817, which may be any suitable wireless communication link (e.g., radio frequency (RF), microwave, infrared (IR), ultraviolet (UV), visible light, etc.). The air interface 815/816/817 may be established using any suitable radio access technology (RAT).

More specifically, as noted above, the communications system 800 may be a multiple access system and may employ one or more channel access schemes, such as CDMA, TDMA, FDMA, OFDMA, SC-FDMA, and the like.

For example, the base station 814a in the RAN 803/804/805 and the WTRUs 802a, 802b, 802c may implement a radio technology such as Universal Mobile Telecommunications System (UMTS) Terrestrial Radio Access (UTRA), which may establish the air interface 815/816/817 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 814a and the WTRUs 802a, 802b, 802c may implement a radio technology such as Evolved UMTS Terrestrial Radio Access (E-UTRA), which may establish the air interface 815/816/817 using Long Term Evolution (LTE) and/or LTE-Advanced (LTE-A).

In other embodiments, the base station 814a and the WTRUs 802a, 802b, 802c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 814b in FIG. 8A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 814b and the WTRUs 802c, 802d may implement a radio technology such as IEEE 802.11 to establish a wireless local area network (WLAN). In another embodiment, the base station 814b and the WTRUs 802c, 802d may implement a radio technology such as IEEE 802.15 to establish a wireless personal area network (WPAN). In yet another embodiment, the base station 814b and the WTRUs 802c, 802d may utilize a cellular-based RAT (e.g., WCDMA, CDMA2000, GSM, LTE, LTE-A, etc.) to establish a picocell or femtocell. As shown in FIG. 8A, the base station 814b may have a direct connection to the Internet 810. Thus, the base station 814b may not be required to access the Internet 810 via the core network 806/807/809.

The RAN 803/804/805 may be in communication with the core network 806/807/809, which may be any type of network configured to provide voice, data, applications, and/or voice over internet protocol (VoIP) services to one or more of the WTRUs 802a, 802b, 802c, 802d. For example, the core network 806/807/809 may provide call control, billing services, mobile location-based services, pre-paid calling, Internet connectivity, video distribution, etc., and/or perform high-level security functions, such as user authentication. Although not shown in FIG. 8A, it will be appreciated that the RAN 803/804/805 and/or the core network 806/807/809 may be in direct or indirect communication with other RANs that employ the same RAT as the RAN 803/804/805 or a different RAT. For example, in addition to being connected to the RAN 803/804/805, which may be utilizing an E-UTRA radio technology, the core network 806/807/809 may also be in communication with another RAN (not shown) employing a GSM radio technology.

The core network 806/807/809 may also serve as a gateway for the WTRUs 802a, 802b, 802c, 802d to access the PSTN 808, the Internet 810, and/or other networks 812. The PSTN 808 may include circuit-switched telephone networks that provide plain old telephone service (POTS). The Internet 810 may include a global system of interconnected computer networks and devices that use common communication protocols, such as the transmission control protocol (TCP), user datagram protocol (UDP) and the internet protocol (IP) in the TCP/IP internet protocol suite. The networks 812 may include wired or wireless communications networks owned and/or operated by other service providers. For example, the networks 812 may include another core network connected to one or more RANs, which may employ the same RAT as the RAN 803/804/805 or a different RAT.

Some or all of the WTRUs 802a, 802b, 802c, 802d in the communications system 800 may include multi-mode capabilities, i.e., the WTRUs 802a, 802b, 802c, 802d may include multiple transceivers for communicating with different wireless networks over different wireless links. For example, the WTRU 802c shown in FIG. 8A may be configured to communicate with the base station 814a, which may employ a cellular-based radio technology, and with the base station 814b, which may employ an IEEE 802 radio technology.

Figure 8B:
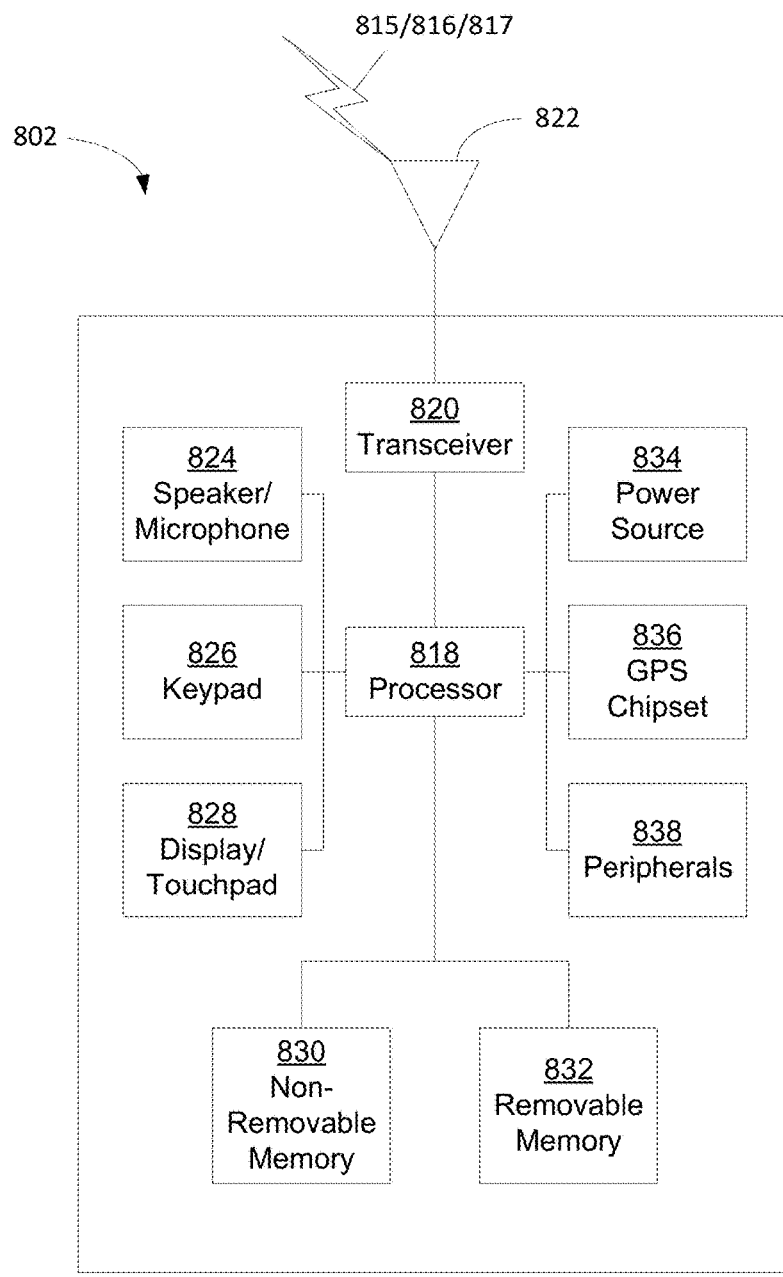
FIG. 8B depicts a system diagram of an example wireless transmit/receive unit (WTRU) that may be used within the communications system illustrated in FIG. 8A.

FIG. 8B is a system diagram of an example WTRU 802. As shown in FIG. 8B, the WTRU 802 may include a processor 818, a transceiver 820, a transmit/receive element 822, a speaker/microphone 824, a keypad 826, a display/touchpad 828, non-removable memory 830, removable memory 832, a power source 834, a global positioning system (GPS) chipset 836, and other peripherals 838. It will be appreciated that the WTRU 802 may include any sub-combination of the foregoing elements while remaining consistent with an embodiment. Also, embodiments contemplate that the base stations 814a and 814b, and/or the nodes that base stations 814a and 814b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 8B and described herein.

The processor 818 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 818 may perform signal coding, data processing, power control, input/output processing, and/or any other functionality that enables the WTRU 802 to operate in a wireless environment. The processor 818 may be coupled to the transceiver 820, which may be coupled to the transmit/receive element 822. While FIG. 8B depicts the processor 818 and the transceiver 820 as separate components, it will be appreciated that the processor 818 and the transceiver 820 may be integrated together in an electronic package or chip.

The transmit/receive element 812 may be configured to transmit signals to, or receive signals from, a base station (e.g., the base station 814a) over the air interface 815/816/817. For example, in one embodiment, the transmit/receive element 812 may be an antenna configured to transmit and/or receive RF signals. In another embodiment, the transmit/receive element 822 may be an emitter/detector configured to transmit and/or receive IR, UV, or visible light signals, for example. In yet another embodiment, the transmit/receive element 822 may be configured to transmit and receive both RF and light signals. It will be appreciated that the transmit/receive element 822 may be configured to transmit and/or receive any combination of wireless signals.

In addition, although the transmit/receive element 822 is depicted in FIG. 8B as a single element, the WTRU 802 may include any number of transmit/receive elements 822. More specifically, the WTRU 802 may employ MIMO technology. Thus, in one embodiment, the WTRU 802 may include two or more transmit/receive elements 822 (e.g., multiple antennas) for transmitting and receiving wireless signals over the air interface 815/816/817.

The transceiver 820 may be configured to modulate the signals that are to be transmitted by the transmit/receive element 822 and to demodulate the signals that are received by the transmit/receive element 822. As noted above, the WTRU 802 may have multi-mode capabilities. Thus, the transceiver 820 may include multiple transceivers for enabling the WTRU 802 to communicate via multiple RATs, such as UTRA and IEEE 802.11, for example.

The processor 818 of the WTRU 802 may be coupled to, and may receive user input data from, the speaker/microphone 824, the keypad 826, and/or the display/touchpad 828 (e.g., a liquid crystal display (LCD) display unit or organic light-emitting diode (OLED) display unit). The processor 818 may also output user data to the speaker/microphone 824, the keypad 826, and/or the display/touchpad 828. In addition, the processor 818 may access information from, and store data in, any type of suitable memory, such as the non-removable memory 830 and/or the removable memory 832. The non-removable memory 830 may include random-access memory (RAM), read-only memory (ROM), a hard disk, or any other type of memory storage device. The removable memory 832 may include a subscriber identity unit (SIM) card, a memory stick, a secure digital (SD) memory card, and the like. In other embodiments, the processor 818 may access information from, and store data in, memory that is not physically located on the WTRU 802, such as on a server or a home computer (not shown).

The processor 818 may receive power from the power source 834, and may be configured to distribute and/or control the power to the other components in the WTRU 802. The power source 834 may be any suitable device for powering the WTRU 802. For example, the power source 834 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 818 may also be coupled to the GPS chipset 836, which may be configured to provide location information (e.g., longitude and latitude) regarding the current location of the WTRU 802. In addition to, or in lieu of, the information from the GPS chipset 836, the WTRU 802 may receive location information over the air interface 815/816/817 from a base station (e.g., base stations 814a, 814b) and/or determine its location based on the timing of the signals being received from two or more nearby base stations. It will be appreciated that the WTRU 802 may acquire location information by way of any suitable location-determination method while remaining consistent with an embodiment.

The processor 818 may further be coupled to other peripherals 838, which may include one or more software and/or hardware units that provide additional features, functionality and/or wired or wireless connectivity. For example, the peripherals 838 may include an accelerometer, an e-compass, a satellite transceiver, a digital camera (for photographs or video), a universal serial bus (USB) port, a vibration device, a television transceiver, a hands free headset, a Bluetooth® unit, a frequency modulated (FM) radio unit, a digital music player, a media player, a video game player unit, an Internet browser, and the like.

Figure 8C:
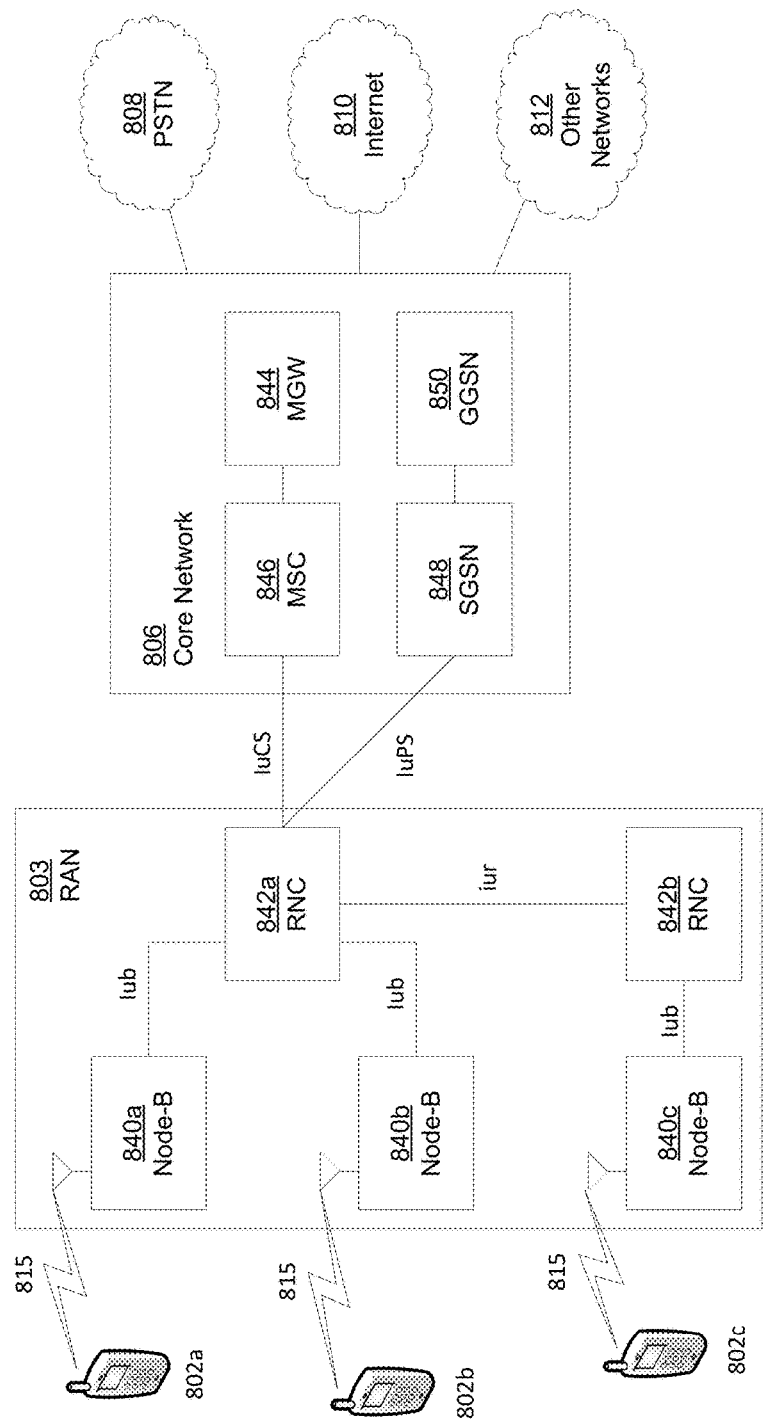
FIG. 8C depicts a system diagram of an example radio access network and an example core network that may be used within the communications system illustrated in FIG. 8A.

FIG. 8C is a system diagram of the RAN 803 and the core network 806 according to an embodiment. As noted above, the RAN 803 may employ a UTRA radio technology to communicate with the WTRUs 802a, 802b, 802c over the air interface 815. The RAN 803 may also be in communication with the core network 806. As shown in FIG. 8C, the RAN 803 may include Node-Bs 840a, 840b, 840c, which may each include one or more transceivers for communicating with the WTRUs 802a, 802b, 802c over the air interface 815. The Node-Bs 840a, 840b, 840c may each be associated with a particular cell (not shown) within the RAN 803. The RAN 803 may also include RNCs 842a, 842b. It will be appreciated that the RAN 803 may include any number of Node-Bs and RNCs while remaining consistent with an embodiment.

As shown in FIG. 8C, the Node-Bs 840a, 840b may be in communication with the RNC 842a. Additionally, the Node-B 840c may be in communication with the RNC 842b. The Node-Bs 840a, 840b, 840c may communicate with the respective RNCs 842a, 842b via an Iub interface. The RNCs 842a, 842b may be in communication with one another via an Iur interface. Each of the RNCs 842a, 842b may be configured to control the respective Node-Bs 840a, 840b, 840c to which it is connected. In addition, each of the RNCs 842a, 842b may be configured to carry out or support other functionality, such as outer loop power control, load control, admission control, packet scheduling, handover control, macrodiversity, security functions, data encryption, and the like.

The core network 806 shown in FIG. 8C may include a media gateway (MGW) 844, a mobile switching center (MSC) 846, a serving GPRS support node (SGSN) 848, and/or a gateway GPRS support node (GGSN) 850. While each of the foregoing elements are depicted as part of the core network 806, it will be appreciated that any one of these elements may be owned and/or operated by an entity other than the core network operator.

The RNC 842a in the RAN 803 may be connected to the MSC 846 in the core network 806 via an IuCS interface. The MSC 846 may be connected to the MGW 844. The MSC 846 and the MGW 844 may provide the WTRUs 802a, 802b, 802c with access to circuit-switched networks, such as the PSTN 808, to facilitate communications between the WTRUs 802a, 802b, 802c and traditional land-line communications devices.

The RNC 842a in the RAN 803 may also be connected to the SGSN 848 in the core network 806 via an IuPS interface. The SGSN 848 may be connected to the GGSN 850. The SGSN 848 and the GGSN 850 may provide the WTRUs 802a, 802b, 802c with access to packet-switched networks, such as the Internet 810, to facilitate communications between and the WTRUs 802a, 802b, 802c and IP-enabled devices.

As noted above, the core network 806 may also be connected to the networks 812, which may include other wired or wireless networks that are owned and/or operated by other service providers.

Figure 8D:
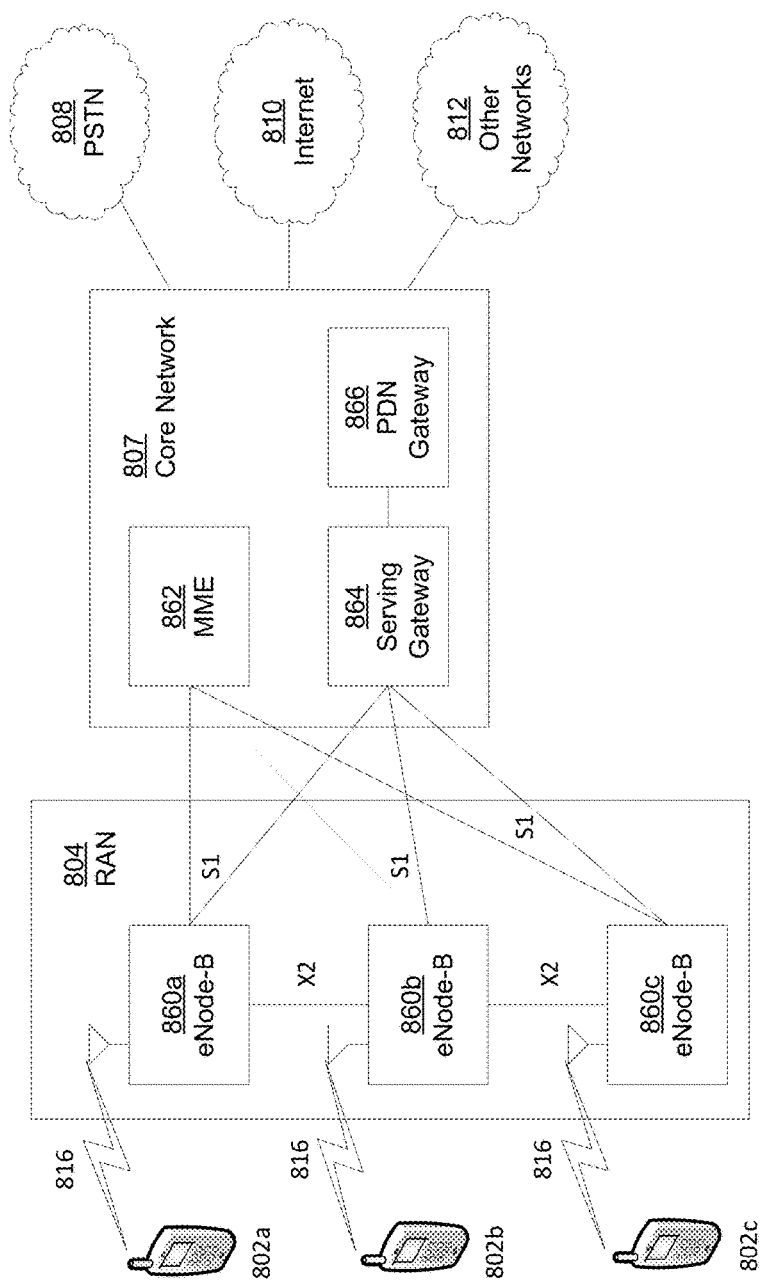
FIG. 8D depicts a system diagram of another example radio access network and an example core network that may be used within the communications system illustrated in FIG. 8A.

FIG. 8D is a system diagram of the RAN 804 and the core network 807 according to an embodiment. As noted above, the RAN 804 may employ an E-UTRA radio technology to communicate with the WTRUs 802a, 802b, 802c over the air interface 816. The RAN 804 may also be in communication with the core network 807.

The RAN 804 may include eNode-Bs 860*a*, 860*b*, 860*c*, though it will be appreciated that the RAN 804 may include any number of eNode-Bs while remaining consistent with an embodiment. The eNode-Bs 860*a*, 860*b*, 860*c* may each include one or more transceivers for communicating with the WTRUs 802*a*, 802*b*, 802*c* over the air interface 816. In one embodiment, the eNode-Bs 860*a*, 860*b*, 860*c* may implement MIMO technology. Thus, the eNode-B 860*a*, for example, may use multiple antennas to transmit wireless signals to, and receive wireless signals from, the WTRU 802*a*.

Each of the eNode-Bs 860*a*, 860*b*, 860*c* may be associated with a particular cell (not shown) and may be configured to handle radio resource management decisions, handover decisions, scheduling of users in the uplink and/or downlink, and the like. As shown in FIG. 8D, the eNode-Bs 860*a*, 860*b*, 860*c* may communicate with one another over an X2 interface.

The core network 807 shown in FIG. 8D may include a mobility management gateway (MME) 862, a serving gateway 864, and a packet data network (PDN) gateway 866. While each of the foregoing elements are depicted as part of the core network 807, it will be appreciated that any one of these elements may be owned and/or operated by an entity other than the core network operator.

The MME 862 may be connected to each of the eNode-Bs 860*a*, 860*b*, 860*c* in the RAN 804 via an S1 interface and may serve as a control node. For example, the MME 862 may be responsible for authenticating users of the WTRUs 802*a*, 802*b*, 802*c*, bearer activation/deactivation, selecting a particular serving gateway during an initial attach of the WTRUs 802*a*, 802*b*, 802*c*, and the like. The MME 862 may also provide a control plane function for switching between the RAN 804 and other RANs (not shown) that employ other radio technologies, such as GSM or WCDMA.

The serving gateway 864 may be connected to each of the eNode-Bs 860*a*, 860*b*, 860*c* in the RAN 804 via the S1 interface. The serving gateway 864 may generally route and forward user data packets to/from the WTRUs 802*a*, 802*b*, 802*c*. The serving gateway 864 may also perform other functions, such as anchoring user planes during inter-eNode B handovers, triggering paging when downlink data is available for the WTRUs 802*a*, 802*b*, 802*c*, managing and storing contexts of the WTRUs 802*a*, 802*b*, 802*c*, and the like.

The serving gateway 864 may also be connected to the PDN gateway 866, which may provide the WTRUs 802*a*, 802*b*, 802*c* with access to packet-switched networks, such as the Internet 810, to facilitate communications between the WTRUs 802*a*, 802*b*, 802*c* and IP-enabled devices.

The core network 807 may facilitate communications with other networks. For example, the core network 807 may provide the WTRUs 802*a*, 802*b*, 802*c* with access to circuit-switched networks, such as the PSTN 808, to facilitate communications between the WTRUs 802*a*, 802*b*, 802*c* and traditional land-line communications devices. For example, the core network 807 may include, or may communicate with, an IP gateway (e.g., an IP multimedia subsystem (IMS) server) that serves as an interface between the core network 807 and the PSTN 808. In addition, the core network 807 may provide the WTRUs 802*a*, 802*b*, 802*c* with access to the networks 812, which may include other wired or wireless networks that are owned and/or operated by other service providers.

Figure 8E:
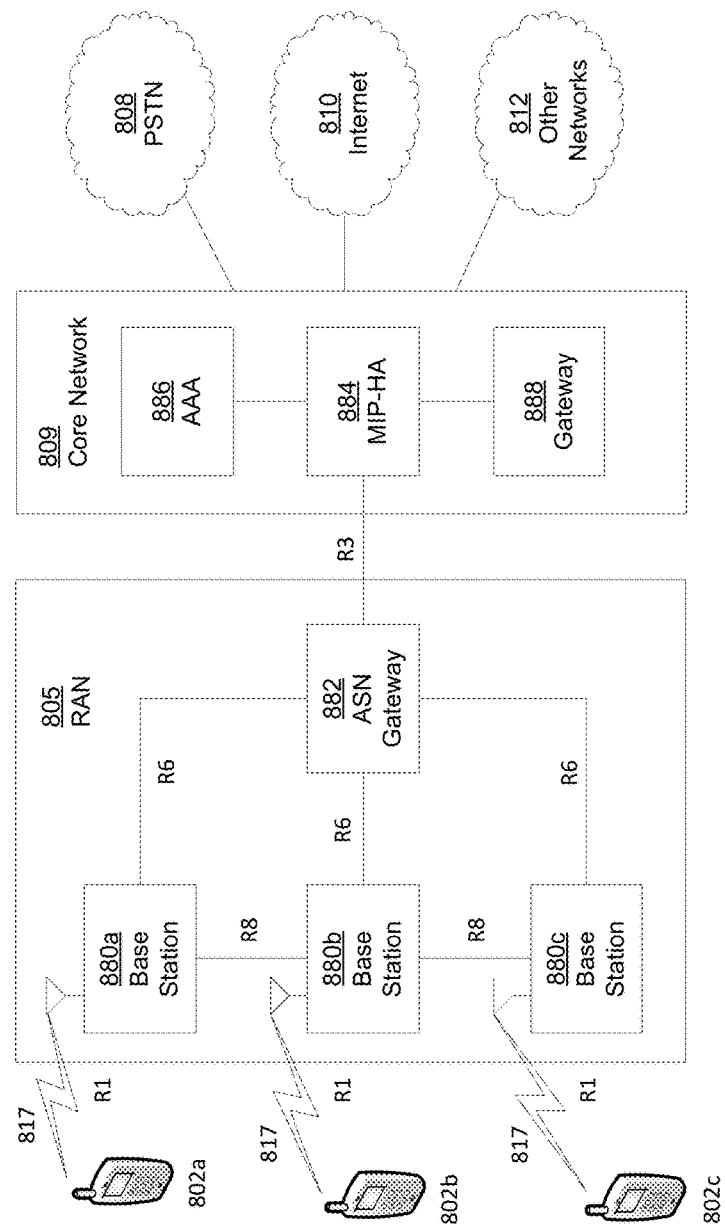
FIG. 8E depicts a system diagram of another example radio access network and an example core network that may be used within the communications system illustrated in FIG. 8A.

FIG. 8E is a system diagram of the RAN 805 and the core network 809 according to an embodiment. The RAN 805 may be an access service network (ASN) that employs IEEE 802.16 radio technology to communicate with the WTRUs 802*a*, 802*b*, 802*c* over the air interface 817. As will be further discussed below, the communication links between the different functional entities of the WTRUs 802*a*, 802*b*, 802*c*, the RAN 805, and the core network 809 may be defined as reference points.

As shown in FIG. 8E, the RAN 805 may include base stations 880*a*, 880*b*, 880*c*, and an ASN gateway 882, though it will be appreciated that the RAN 805 may include any number of base stations and ASN gateways while remaining consistent with an embodiment. The base stations 880*a*, 880*b*, 880*c* may each be associated with a particular cell (not shown) in the RAN 805 and may each include one or more transceivers for communicating with the WTRUs 802*a*, 802*b*, 802*c* over the air interface 817. In one embodiment, the base stations 880*a*, 880*b*, 880*c* may implement MIMO technology. Thus, the base station 880*a*, for example, may use multiple antennas to transmit wireless signals to, and receive wireless signals from, the WTRU 802*a*. The base stations 880*a*, 880*b*, 880*c* may also provide mobility management functions, such as handoff triggering, tunnel establishment, radio resource management, traffic classification, quality of service (QoS) policy enforcement, and the like. The ASN gateway 882 may serve as a traffic aggregation point and may be responsible for paging, caching of subscriber profiles, routing to the core network 809, and the like.

The air interface 817 between the WTRUs 802*a*, 802*b*, 802*c* and the RAN 805 may be defined as an R1 reference point that implements the IEEE 802.16 specification. In addition, each of the WTRUs 802*a*, 802*b*, 802*c* may establish a logical interface (not shown) with the core network 809. The logical interface between the WTRUs 802*a*, 802*b*, 802*c* and the core network 809 may be defined as an R2 reference point, which may be used for authentication, authorization, IP host configuration management, and/or mobility management.

The communication link between each of the base stations 880*a*, 880*b*, 880*c* may be defined as an R8 reference point that includes protocols for facilitating WTRU handovers and the transfer of data between base stations. The communication link between the base stations 880*a*, 880*b*, 880*c* and the ASN gateway 882 may be defined as an R6 reference point. The R6 reference point may include protocols for facilitating mobility management based on mobility events associated with each of the WTRUs 802*a*, 802*b*, 802*c*.

As shown in FIG. 8E, the RAN 805 may be connected to the core network 809. The communication link between the RAN 805 and the core network 809 may defined as an R3 reference point that includes protocols for facilitating data transfer and mobility management capabilities, for example. The core network 809 may include a mobile IP home agent (MIP-HA) 884, an authentication, authorization, accounting (AAA) server 886, and a gateway 888. While each of the foregoing elements are depicted as part of the core network 809, it will be appreciated that any one of these elements may be owned and/or operated by an entity other than the core network operator.

The MIP-HA may be responsible for IP address management, and may enable the WTRUs 802*a*, 802*b*, 802*c* to roam between different ASNs and/or different core networks. The MIP-HA 884 may provide the WTRUs 802*a*, 802*b*, 802*c* with access to packet-switched networks, such as the Internet 810, to facilitate communications between the WTRUs 802*a*, 802*b*, 802*c* and IP-enabled devices. The AAA server 886 may be responsible for user authentication and for supporting user services. The gateway 888 may facilitate interworking with other networks. For example, the gateway 888 may provide the WTRUs 802*a*, 802*b*, 802*c* with access to circuit-switched networks, such as the PSTN 808, to facilitate communications between the WTRUs 802*a*, 802*b*, 802*c* and traditional land-line communications devices. In addition, the gateway 888 may provide the WTRUs 802*a*, 802*b*, 802*c* with access to the networks 812, which may include other wired or wireless networks that are owned and/or operated by other service providers.

Although not shown in FIG. 8E, it will be appreciated that the RAN 805 may be connected to other ASNs and the core network 809 may be connected to other core networks. The communication link between the RAN 805 the other ASNs may be defined as an R4 reference point, which may include protocols for coordinating the mobility of the WTRUs 802*a*, 802*b*, 802*c* between the RAN 805 and the other ASNs. The communication link between the core network 809 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for coding videos, the method comprising:
   receiving a video bitstream that comprises an indication of a reference picture list, wherein the reference picture list comprises one or more reference pictures associated with a current picture, and wherein at least one of the one or more reference pictures is associated with a decoded portion of the current picture;
   for each of the one or more reference pictures, determining whether to retrieve weighted prediction parameters for the reference picture from the video bitstream based at least in part on a picture order count associated with the current picture and a picture order count associated with the reference picture, wherein, on a condition that the picture order count associated with the reference picture is different than the picture order count associated with the current picture, the weighted prediction parameters associated with the reference picture are retrieved from the video bitstream, and wherein, at least in part on a condition that the picture order count associated with the reference picture is the same as the picture order count associated with the current picture, weighted prediction parameters associated with the reference picture are determined so as to disable weighted prediction;
   receiving a video block associated with the current picture, a reference picture index associated with the video block, and a motion vector associated with the video block;
   determining weighted prediction parameters associated with the video block based on the reference picture index associated with the video block and the weighted prediction parameters associated with one of the one or more reference pictures; and
   reconstructing the video block using the reference picture index, the motion vector, and the weighted prediction parameters associated with the video block;
   determining, based on the video bitstream, that a second video block is coded in an intra mode and that constrained intra prediction (CIP) is enabled; and
   determining whether a reference sample is available for predicting the second video block based at least on a coding mode of the reference sample, wherein, on a condition that the coding mode of the reference sample is an intra mode, the reference sample is determined to be available for predicting the second video block, and wherein, on a condition that the coding mode of the reference sample is an inter mode, the reference sample is determined to be unavailable for predicting the second video block.

2. The method of claim 1, wherein, for each of the one or more reference pictures, on a condition that the picture order count associated with the current picture and the picture order count associated with the reference picture are the same, and that a layer identifier (ID) associated with the current picture and a layer ID associated with the reference picture are different from each other, weighted prediction parameters are retrieved from the video bitstream.

3. The method of claim 2, wherein, for each of the one or more reference pictures, on a condition that the respective picture order counts associated with the current picture and the reference picture are the same as each other, and that the respective layer IDs associated with the current picture and the reference picture are the same as each other, weighted prediction parameters for the reference picture are determined so as to disable weighted prediction.

4. The method of claim 1, further comprising:
   adding the at least one of the one or more reference pictures that is associated with a decoded portion of the current picture to a first reference picture list associated with the current picture; and
   adding the at least one of the one or more reference pictures that is associated with a decoded portion of the current picture to a second reference picture list associated with the current picture.

5. The method of claim 1, wherein the reference sample is comprised in the reconstructed current picture, wherein the determining of whether the reference sample is available for predicting the second video block is based further on the picture order count associated with the current picture and respective picture order counts associated with one or more reference pictures of the current picture, and wherein, on a condition that the picture order count associated with the current picture is the same as the respective picture order counts associated with each of the one or more reference pictures, the reference sample is determined to be available for predicting the second video block if the reference sample is coded using one or more intra-coded video blocks.

6. The method of claim 1, further comprising, on a condition that the respective picture order counts associated with the current picture and the reference picture are the same as each other:

deriving a block vector for identifying one or more chroma reference samples for the video block;

determining whether interpolation filtering is applicable to the one or more chroma reference samples based on the block vector;

determining whether the one or more chroma reference samples are available for predicting the video block based at least on whether the one or more chroma reference samples are in a decoded area of the current picture and whether the one or more chroma reference samples are in a same slice or tile as the video block; and on a condition that interpolation filtering is determined to be applicable to the one or more chroma reference samples and that the one or more chroma reference samples are determined to be available for predicting the video block, applying interpolation filtering to the one or more chroma reference samples to generate chroma prediction samples for the video block.

7. The method of claim 1, wherein the video block is signaled as an inter-coded video block.

8. The method of claim 1, wherein the determining of weighted prediction parameters for each of the one or more reference pictures is performed at a slice level.

9. A video coding device comprising:

a processor configured to receive a video bitstream that comprises an indication of a reference picture list, wherein the reference picture list comprises one or more reference pictures associated with a current picture, and wherein at least one of the one or more reference pictures is associated with a decoded portion of the current picture;

for each of the one or more reference pictures, determine whether to retrieve weighted prediction parameters for the reference picture from the video bitstream based at least in part on a picture order count associated with the current picture and a picture order count associated with the reference picture, wherein, on a condition that the picture order count associated with the reference picture is different than the picture order count associated with the current picture, the weighted prediction parameters associated with the reference picture are retrieved from the video bitstream, and wherein, at least in part on a condition that the picture order count associated with the reference picture is the same as the picture order count associated with the current picture, weighted prediction parameters associated with the reference picture are determined so as to disable weighted prediction;

receive a video block associated with the current picture, a reference picture index associated with the video block, and a motion vector associated with the video block;

determine weighted prediction parameters associated with the video block based on the reference picture index associated with the video block and the weighted prediction parameters associated with one of the one or more reference pictures; and reconstruct the video block using the reference picture index, the motion vector, and the weighted prediction parameters associated with the video block;

determine, based on the video bitstream, that a second video block is coded in an intra mode and that constrained intra prediction (CIP) is enabled; and determine whether a reference sample is available for predicting the second video block based at least on a coding mode of the reference sample, wherein, on a condition that the coding mode of the reference sample is an intra mode, the reference sample is determined to be available for predicting the second video block, and wherein, on a condition that the coding mode of the reference sample is an inter mode, the reference sample is determined to be unavailable for predicting the second video block.

10. The video coding device of claim 9, wherein, for each of the one or more reference pictures, on a condition that the picture order count associated with the current picture and the picture order count associated with the reference picture are the same, the processor is further configured to determine that a layer identifier (ID) associated with the current picture and a layer ID associated with the reference picture are different from each other, and to retrieve weighted prediction parameters associated with the reference picture from the video bitstream.

11. The video coding device of claim 10, wherein, on a condition that the respective picture order counts associated with the current picture and the reference picture are the same as each other, and that the respective layer IDs associated with the current picture and the reference picture are the same as each other, the processor is configured to determine weighted prediction parameters associated with the reference picture so as to disable weighted prediction.

12. The video coding device of claim 9, wherein the processor is configured to add the at least one of the one or more reference pictures that is associated with a decoded portion of the current picture to a first reference picture list associated with the current picture and add the at least one of the one or more reference pictures that is associated with a decoded portion of the current picture to a second reference picture list associated with the current picture.

13. The video coding device of claim 9, wherein the reference sample is comprised in the reconstructed current picture, wherein the processor is configured to determine whether the reference sample is available for predicting the second video block based further on the picture order count associated with the current picture and respective picture order counts associated with one or more reference pictures of the current picture, and wherein, on a condition that the picture order count associated with the current picture is the same as the respective picture order counts associated with each of the one or more reference pictures, the reference sample is determined to be available for predicting the second video block if the reference sample is coded using one or more intra-coded video blocks.

14. The video coding device of claim 9, wherein the processor is further configured to, on a condition that the respective picture order counts associated with the current picture and the reference picture are the same:

derive a block vector for identifying one or more chroma reference samples for the video block;

determine whether interpolation filtering is applicable to the one or more chroma reference samples based on the block vector;

determine whether the one or more chroma reference samples are available for predicting the video block; and on a condition that interpolation filtering is determined to be applicable to the one or more chroma reference samples and that the one or more chroma reference samples are determined to be available for predicting the video block, apply interpolation filtering to the one or more chroma reference samples to generate chroma prediction samples for the video block.

15. The video coding device of claim 9, wherein the video block is signaled as an inter-coded video block.

16. The video coding device of claim 9, wherein the processor is configured to determine the weighted prediction parameters for each of the one or more-reference pictures at a slice level.

\* \* \* \* \*